United States Patent
Oh et al.

(10) Patent No.: US 11,576,159 B2
(45) Date of Patent: *Feb. 7, 2023

(54) METHOD AND APPARATUS FOR TRANSMITTING UPLINK CONTROL INFORMATION IN WIRELESS COMMUNICATION SYSTEM

(71) Applicant: Samsung Electronics Co., Ltd., Suwon-si (KR)

(72) Inventors: Jinyoung Oh, Seoul (KR); Jeongho Yeo, Hwaseong-si (KR); Seunghoon Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

This patent is subject to a terminal disclaimer.

(21) Appl. No.: 16/936,267

(22) Filed: Jul. 22, 2020

(65) Prior Publication Data

US 2020/0351869 A1 Nov. 5, 2020

Related U.S. Application Data

(63) Continuation of application No. 15/466,766, filed on Mar. 22, 2017, now Pat. No. 10,728,884.

(30) Foreign Application Priority Data

Mar. 22, 2016 (KR) .................. 10-2016-0034104
Aug. 12, 2016 (KR) .................. 10-2016-0102770

(51) Int. Cl.
*H04L 5/00* (2006.01)
*H04W 72/04* (2023.01)
(Continued)

(52) U.S. Cl.
CPC ......... *H04W 72/0413* (2013.01); *H04L 67/12* (2013.01); *H04W 72/044* (2013.01); *H04W 74/006* (2013.01)

(58) Field of Classification Search
None
See application file for complete search history.

(56) References Cited

U.S. PATENT DOCUMENTS 9,215,040 B2 * 12/2015 Yang .................. H04B 7/15542
9,301,287 B2 * 3/2016 Seo .................... H04W 72/0413
(Continued)

FOREIGN PATENT DOCUMENTS

CN 103444106 A 12/2013
CN 104067545 A 9/2014
(Continued)

OTHER PUBLICATIONS

Office Action dated Nov. 2, 2021 in connection with Chinese Patent Application No. 201780012948.0, 15 pages.
(Continued)

*Primary Examiner* — Sithu Ko

(57) ABSTRACT

A communication technique for combining a 5G communication system for supporting a higher data rate after 4G system with IoT technology includes transmitting configuration information of one or more serving cells that operate in an unlicensed band to a terminal, transmitting information indicating that an uplink control channel and an uplink data channel can be simultaneously transmitted to the terminal, determining whether the terminal is configured to transmit at least one of data and the uplink control information through the uplink data channel in at least one of a licensed band and the unlicensed band, and receiving the uplink control information in at least one of the licensed band and the unlicensed band on the basis of the determination, wherein the configuration information includes unlicensed-band uplink con- (Continued)

trol channel configuration information for configuring the uplink control channel in one of the serving cells that operate in the unlicensed band.

16 Claims, 9 Drawing Sheets

(51) Int. Cl.
*H04W 74/00* (2009.01)
*H04L 67/12* (2022.01)
*H04W 72/044* (2023.01)

(56) References Cited

U.S. PATENT DOCUMENTS

| | | | |
|---|---|---|---|
| 9,363,820 B2* | 6/2016 | Wang | H04W 72/10 |
| 10,433,288 B2* | 10/2019 | Yang | H04L 1/1671 |
| 2010/0027446 A1 | 2/2010 | Choi et al. | |
| 2011/0249763 A1 | 10/2011 | Tosato et al. | |
| 2012/0113827 A1 | 5/2012 | Yamada et al. | |
| 2012/0189075 A1 | 7/2012 | Wang et al. | |
| 2012/0213169 A1 | 8/2012 | Wang et al. | |
| 2012/0320805 A1 | 12/2012 | Yang et al. | |
| 2012/0320852 A1 | 12/2012 | Seo et al. | |
| 2013/0039231 A1* | 2/2013 | Wang | H04W 72/10 370/280 |
| 2013/0039321 A1* | 2/2013 | Kim | H04L 5/00 370/329 |
| 2013/0077542 A1* | 3/2013 | Yang | H04B 7/15542 370/280 |
| 2013/0322397 A1 | 12/2013 | Lee et al. | |
| 2014/0029484 A1 | 1/2014 | Choi et al. | |
| 2014/0036853 A1 | 2/2014 | Kim et al. | |
| 2014/0112277 A1 | 4/2014 | Yang et al. | |
| 2014/0119246 A1 | 5/2014 | Yin et al. | |
| 2014/0321337 A1 | 10/2014 | Kim et al. | |
| 2015/0036566 A1 | 2/2015 | Blankenship et al. | |
| 2015/0156762 A1 | 6/2015 | Hwang et al. | |
| 2015/0181589 A1 | 6/2015 | Luo et al. | |
| 2015/0201431 A1 | 7/2015 | Um et al. | |
| 2015/0223231 A1 | 8/2015 | Noh | |
| 2015/0334699 A1* | 11/2015 | Uchino | H04L 5/0053 370/329 |
| 2016/0014797 A1 | 1/2016 | Cheng et al. | |
| 2016/0021664 A1 | 1/2016 | Chou | |
| 2016/0056933 A1 | 2/2016 | Aiba et al. | |
| 2016/0212649 A1 | 7/2016 | Chen et al. | |
| 2016/0226629 A1 | 8/2016 | Liu et al. | |
| 2016/0278074 A1 | 9/2016 | Yang et al. | |
| 2017/0215082 A1 | 7/2017 | Hwang et al. | |
| 2017/0223640 A1 | 8/2017 | Dinan | |
| 2017/0250781 A1 | 8/2017 | Golitschek Edler Von Elbwart et al. | |
| 2017/0318575 A1 | 11/2017 | Park et al. | |
| 2017/0374679 A1 | 12/2017 | Park et al. | |
| 2018/0049186 A1* | 2/2018 | Hong | H04W 72/0446 |
| 2018/0070352 A1* | 3/2018 | Takeda | H04W 72/0446 |
| 2018/0199369 A1 | 7/2018 | Larsson et al. | |
| 2019/0116498 A1* | 4/2019 | Kim | H04M 1/724631 |
| 2020/0235892 A1* | 7/2020 | Marinier | H04L 1/0057 |

FOREIGN PATENT DOCUMENTS

| | | |
|---|---|---|
| KR | 10-1100445 B1 | 12/2011 |
| KR | 10-2014-0016136 A | 2/2014 |
| KR | 10-2015-0085455 A | 7/2015 |
| KR | 10-2016-0010848 A | 1/2016 |
| KR | 10-2228177 B1 | 3/2021 |
| WO | 2016036081 A1 | 3/2016 |

OTHER PUBLICATIONS

Office Action dated Oct. 13, 2021 in connection with U.S. Appl. No. 16/086,060, 36 pages.
Qualcomm Incorporated; "SRS Design Details"; 3GPP TSG RAN WG1 #84; R1-160887; St Julians, Malta; Feb. 15-19, 2016; 4 pages.
Ericsson; "On UL Channel Access Procedures for Enhanced LAA"; 3GPP TSG RAN WG1 #84; R1-161001; St. Julians, Malta; Feb. 15-19, 2016; 9 pages.
ETRI; "Discussion on SRS Transmissions for eLAA"; 3GPP TSG RAN WG1 #84; R1-160992; St. Julians, Malta; Feb. 15-19, 2016; 4 pages.
NTT DOCOMO, Inc.; "Discussion on SRS Design for eLAA UL"; 3GPP TSG RAN WG1 #84; R1-160948; St. Julians, Malta; Feb. 15-19, 2016; 5 pages.
"3rd Generation Partnership Project; Technical Specification Group Radio Access Network; Evolved Universal Terrestrial Radio Access (E-UTRA); Physical Layer Procedures (Release 13)"; 3GPP TS 36.213 V13.0.1; Jan. 2016; 81 pages.
Samsung; "Discussion on PUCCH for UL LAA"; 3GPP TSG RAN WG1 #84; R1-160563; St. Julians, Malta; Feb. 15-19, 2016; 2 pages.
Extended European Search Report dated Jan. 16, 2019 for European Patent Application No. 17770593.6, 9 pages.
ITL, "On the UCI multiplexing for LAA with DL and UL transmission", 3GPP TSG RAN WG1 Meeting #80bis, R1-153275, May 2015, 3 pages.
Huawei et al., "UCI transmission for eLAA", 3GPP TSG RAN WG1 Meeting #84, R1-160747, Feb. 2016, 2 pages.
Samsung, "Discussion on UCI transmission for UL LAA", 3GPP TSG RAN WG1 Meeting #84, R1-160558, Feb. 2016, 2 pages.
Korean Intellectual Property Office, "Notification of a Decision to Grant," dated Aug. 9, 2022, in connection with Korean Patent Application No. 10-2016-0102770, 7 pages.
USPTO, "Final Office Action," dated Dec. 21, 2022, in connection with Application No. 16,086,060, 32 pages.

* cited by examiner

METHOD AND APPARATUS FOR TRANSMITTING UPLINK CONTROL INFORMATION IN WIRELESS COMMUNICATION SYSTEM

CROSS-REFERENCE TO RELATED APPLICATIONS

This application is a continuation of application Ser. No. 15/466,766, filed Mar. 22, 2017, which claims priority to Korean Application No. 10-2016-0034104, filed, Mar. 22, 2016, and Korean Application No. 10-2016-0102770, filed Aug. 12, 2016, the entire disclosures of which are hereby incorporated by reference.

BACKGROUND

1. Field

The present disclosure relates to a method and an apparatus for transmitting uplink control information and data efficiently in a mobile communication system that operates in an unlicensed band or in a mobile communication system that requires channel sensing (or listen-before-talk).

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Recently, with the development of Long Term Evolution (LTE) and LTE-Advanced, researches for technology to operate a mobile communication system in an unlicensed band have been actively made, and in particular, channel sensing (or listen-before-talk) may be needed in such an unlicensed band. In this case, there is a need for a method and an apparatus for smoothly operating the mobile communication system in the unlicensed band.

SUMMARY

To address the above-discussed deficiencies, it is a primary object is to provide a method and an apparatus for transmitting uplink control information more efficiently through configuration of a cell in which the uplink control information of a terminal is transmitted in accordance with at least one of whether to transmit an uplink data channel and whether the uplink control information can be transmitted in a mobile communication system that operates in an unlicensed band or in a mobile communication system that requires channel sensing (or listen-before-talk).

In accordance with an aspect of the present disclosure, a method for receiving uplink control information of a base station includes transmitting configuration information of one or more serving cells that operate in an unlicensed band to a terminal; transmitting information indicating that an uplink control channel and an uplink data channel can be simultaneously transmitted to the terminal; determining whether the terminal is configured to transmit at least one of data and the uplink control information through the uplink data channel in at least one of a licensed band and the unlicensed band; and receiving the uplink control information in at least one of the licensed band and the unlicensed band on the basis of the determination, wherein the configuration information includes unlicensed-band uplink control channel configuration information for configuring the uplink control channel in one of the serving cells that operate in the unlicensed band.

If only the unlicensed-band serving cell in which the uplink control channel is configured is in an idle state in the case where the terminal is configured not to transmit at least one of the data and the uplink control information through the uplink data channel in the licensed band as the result of the determination, the uplink control information may be received through the uplink control channel and the uplink data channel in a state where the uplink data channel is configured in the unlicensed-band serving cell in which the uplink control channel is configured, whereas the uplink control information may be received through the uplink control channel in a state where the uplink data channel is not configured in the unlicensed-band serving cell in which the uplink control channel is configured.

If the unlicensed-band serving cell in which the uplink control channel is configured is not in an idle state, but the at least one unlicensed-band serving cell in which the uplink data channel is configured is in the idle state in the case where the terminal is configured not to transmit at least one of the data and the uplink control information through the uplink data channel in the licensed band as the result of the determination, the uplink control information may be received through the uplink data channel of the cell having the lowest cell index among the unlicensed-band serving cells in which the uplink data channel is configured.

In the case where the terminal is configured to transmit at least one of the data and the uplink control information through the uplink data channel in the licensed band as the result of the determination, the uplink control information may be received through the uplink data channel in the licensed band.

If the unlicensed-band serving cell in which the uplink control channel is configured is in an idle state in the case where the terminal is configured not to transmit at least one of the data and the uplink control information through the uplink data channel in the licensed band and the unlicensed band as the result of the determination, the uplink control information may be received through the uplink control channel, whereas if the unlicensed-band serving cell is not in the idle state, the uplink control information may be received through the uplink control channel in the licensed band.

In accordance with another aspect of the present disclosure, a method for transmitting uplink control information of a terminal includes receiving configuration information of one or more serving cells that operate in an unlicensed band from a base station; receiving information indicating that an uplink control channel and an uplink data channel can be simultaneously transmitted from the base station; determining whether it is configured to transmit at least one of data and the uplink control information through the uplink data channel in at least one of a licensed band and the unlicensed band; and transmitting the uplink control information in at least one of the licensed band and the unlicensed band on the basis of the determination, wherein the configuration information includes unlicensed-band uplink control channel configuration information for configuring the uplink control channel in one of the serving cells that operate in the unlicensed band.

In accordance with still another aspect of the present disclosure, a base station for receiving uplink control information includes a transceiver unit configured to transmit and receive signals with a terminal; and a control unit configured to control the transceiver unit to transmit configuration information of one or more serving cells that operate in an unlicensed band and information indicating that an uplink control channel and an uplink data channel can be simultaneously transmitted to the terminal, to determine whether the terminal is configured to transmit at least one of data and the uplink control information through the uplink data channel in at least one of a licensed band and the unlicensed band, and to control the transceiver unit to receive the uplink control information in at least one of the licensed band and the unlicensed band on the basis of the determination, wherein the configuration information includes unlicensed-band uplink control channel configuration information for configuring the uplink control channel in one of the serving cells that operate in the unlicensed band.

In accordance with yet still another aspect of the present disclosure, a terminal for transmitting uplink control information includes a transceiver unit configured to transmit and receive signals with a base station; and a control unit configured to control the transceiver unit to receive configuration information of one or more serving cells that operate in an unlicensed band and information indicating that an uplink control channel and an uplink data channel can be simultaneously transmitted from the base station, to determine whether it is configured to transmit at least one of data and the uplink control information through the uplink data channel in at least one of a licensed band and the unlicensed band, and to control the transceiver unit to transmit the uplink control information in at least one of the licensed band and the unlicensed band on the basis of the determination, wherein the configuration information includes unlicensed-band uplink control channel configuration information for configuring the uplink control channel in one of the serving cells that operate in the unlicensed band.

According to the aspects of the present disclosure, uplink control information can be efficiently transmitted and complexity of a terminal can be minimized through configuration of a cell in which the uplink control information of the terminal is transmitted in accordance with at least one of whether to transmit an uplink data channel and whether the uplink control information can be transmitted.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
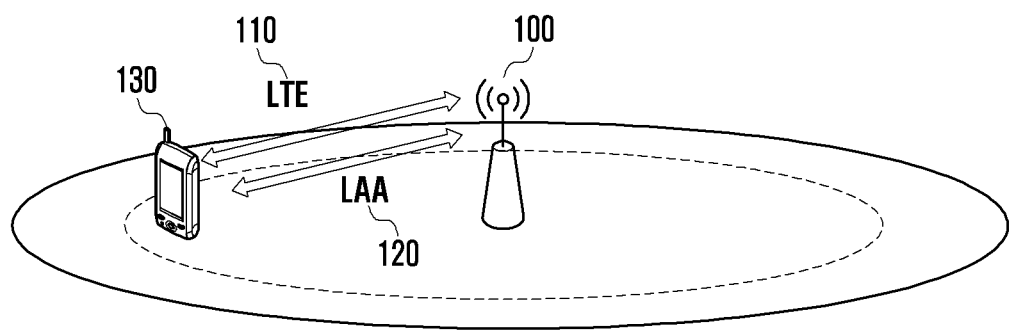
FIGS. 1 and 2 are diagrams illustrating a communication system to which the present disclosure is applied.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, embodiments of the present disclosure will be described in detail with reference to the accompanying drawings. In describing the present disclosure, related well-known functions or configurations incorporated herein are not described in detail in the case where it is determined that they obscure the subject matter of the present disclosure in unnecessary detail. Further, terms to be described later are terms defined in consideration of their functions in the present disclosure, but may differ depending on intentions of a user and an operator or customs. Accordingly, they should be defined on the basis of the contents of the whole description of the present disclosure.

The aspects and features of the present disclosure and methods for achieving the aspects and features will be apparent by referring to the embodiments to be described in detail with reference to the accompanying drawings. However, the present disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

Recently, a mobile communication system has been developed from an initial mobile communication system that provides voice-oriented services to a high-speed and high-quality wireless packet data communication system that provides data and multimedia services. In order to support such high-speed and high-quality wireless packet data transmission services, various mobile communication standards, such as 3rd Generation Partnership Project (3GPP) High Speed Downlink Packet Access (HSDPA), High Speed Uplink Packet Access (HSUPA), Long Term Evolution (LTE), and Long Term Evolution Advanced (LTE-A), 3GPP2 High Rate Packet Data (HRPD), and Institute of Electrical and Electronics Engineers (IEEE) 802.16, have been developed.

In particular, standards development and evolution of LTE/LTE-A/LTE-A-Pro (hereinafter referred to as "LTE") have been continuously repeated to improve system capacity and frequency efficiency. Representatively, an LTE system can greatly increase the data rate and the system capacity in accordance with the usable frequency bandwidth using Carrier Aggregation (CA) that can operate the system using plural frequency bands. However, the frequency band in which the LTE system currently operates corresponds to a licensed band (or licensed spectrum or licensed carrier) that can be exclusively used by a specific operator that has its own authority. However, in the case of general frequency bands (e.g., frequency bands that are equal to or lower than 5 GHz) for providing mobile communication services, other operators or other communication systems have already used them, and thus it is difficult for mobile communication service providers to secure plural licensed frequency bands.

Accordingly, in order to efficiently process mobile data that are explosively being increased in an environment in which it is difficult to secure such licensed frequency bands, technology to make efficient use of an LTE system in an unlicensed band (or unlicensed spectrum or unlicensed carrier) (e.g., LTE in Unlicensed (LTE-U) or Licensed-Assisted Access (LAA)) has recently been studied. In an unlicensed band, a specific operator or a specific system does not exclusively use a specific band, but all allowable communication devices share and use the same frequency band. In this case, since 5 GHz unlicensed band is used by a relatively small number of communication devices in comparison to 2.4 GHz unlicensed band, and enables very wide bandwidth to be utilized, it may be one of unlicensed frequency bands that facilitate security of additional frequency bands.

In the case of making efficient use of a licensed band and an unlicensed band using LTE technology that aggregates and use plural frequency bands, in other words, Carrier Aggregation (CA) technology, the system capacity can be easily increased. That is, the LTE system can be operated in a licensed band and an unlicensed band through configuration of an LTE cell in the licensed band as a PCell (or Pcell) and configuration of an LTE cell (or LAA cell or LTE-U cell) in the unlicensed band as an SCell (or Scell or LAA SCell) using the CA technology. In this case, the above-described system can be applied to not only the CA environment in which the licensed band and the unlicensed band are connected through ideal backhaul but also the dual-connectivity environment in which the licensed band and the unlicensed band are connected through non-ideal backhaul. In the present disclosure, explanation will be made on the assumption that the system is applied to the CA environment in which the licensed band and the unlicensed band are connected through the ideal backhaul.

Figure 2:
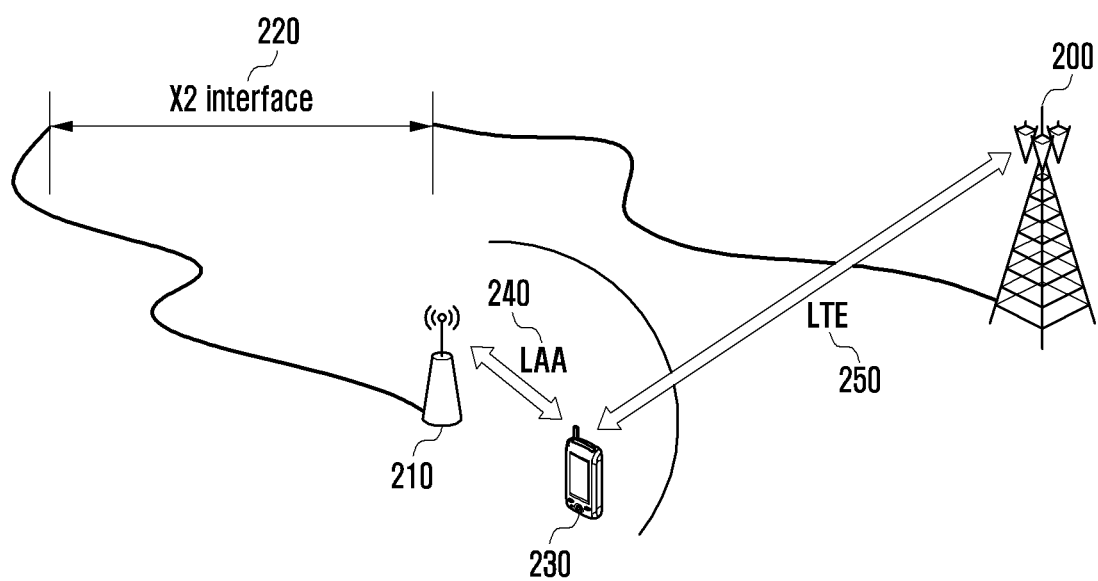

FIGS. 1 and 2 are diagrams illustrating a communication system to which the present disclosure is applied.

Referring to FIG. 1 that illustrates a case where an LTE cell 110 and an LAA cell 120 coexist in one small base station 100, a terminal 130 transmits and receives data with the base station 100 through the LTE cell 110 and the LAA cell 120. There is no limit in a duplex type of the LTE cell 110 or the LAA cell 120, but it may be assumed that a cell that performs data transmission/reception using a licensed band is an LTE cell 110 or a PCell, and a cell that performs data transmission/reception using an unlicensed band is an LAA cell 120 or an SCell. However, in the case where the LTE cell is the PCell, it may be limited that uplink transmission can be performed only through the LTE cell 110.

FIG. 2 illustrates installation of an LTE macro base station 200 for wide coverage and an LAA small base station 210 for data rate increase in a network. In this case, there is no limit in a duplex type of the LTE macro base station 200 or the LAA small base station 210. In this case, the LTE macro base station 200 may be replaced by the LTE small base station. Further, in the case where the LTE cell is the PCell, it may be configured that uplink transmission can be performed only through the LTE base station 200. In this case, it is assumed that the LTE base station 200 and the LAA base station 210 have an ideal backhaul network. Accordingly, X2 communication 220 becomes possible between fast base stations, and even if the uplink transmission is possible only between the terminal and the LTE base station 200, the LAA base station 210 can receive related control information in real time from the LTE base station 200 through the X2 communication 220. Schemes that are proposed in the present disclosure can be applied to both the system of FIG. 1 and the system of FIG. 2.

In general, an LTE/LTE-A system is a system that transmits data using an Orthogonal Frequency Division Multiple Access (OFDM) transmission system. In the OFDM system, a modulation signal is located in 2D resources that are composed of time and frequency. Resources on the time axis are discriminated from each other through different OFDM symbols, and are orthogonal to each other. Resources on the frequency axis are discriminated from each other through different subcarriers, and are also orthogonal to each other.

That is, in the OFDM system, one minimum unit resource may be indicated through designation of a specific OFDM symbol on the time axis and designation of a specific subcarrier on the frequency axis, and may be called a Resource Element (RE). Different REs have the characteristics of being orthogonal to each other even if they pass through frequency selective channels, and thus signals that are transmitted on the different REs can be received in the reception side without generating mutual interference.

Figure 3:
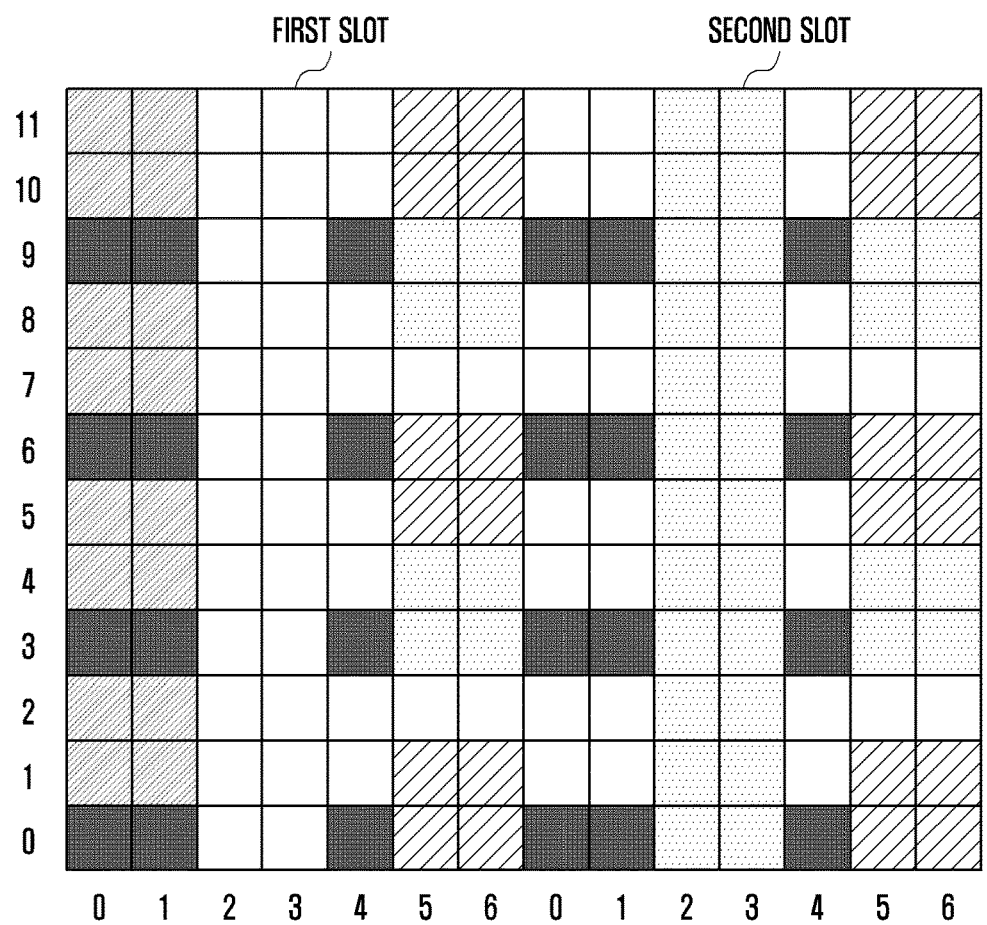
FIG. 3 is a diagram illustrating a wireless resource configuration of an LTE system.

FIG. 3 is a diagram illustrating downlink physical resources of an LTE system.

In an OFDM communication system, a downlink bandwidth is composed of a plurality of Resource Blocks (hereinafter referred to as "RBs"), and each Physical Resource Block (hereinafter referred to as "PRB") may be composed of 12 subcarriers that are arranged along the frequency axis and 7 or 6 OFDM symbols that are arranged along the time axis as shown in FIG. 3. On the time axis, a subframe is composed of two slots, that is, a first slot and a second slot, each of which has a length of 0.5 ms as shown in FIG. 3. From the wireless resources as illustrated in FIG. 3, different kinds of signals may be transmitted as follows.

Cell Specific RS (CRS) 300: This is a reference signal which is periodically transmitted for all terminals that belong to one cell. The CRS may be commonly used by a plurality of terminals.

Demodulation Reference Signal (DMRS) 310: This is a reference signal that is transmitted for a specific terminal. The DMRS is transmitted only in the case where data is transmitted to the corresponding terminal. The DMRS may be composed of 8 DMRS ports in all. In the LTE/LTE-A, ports 7 to 14 correspond to DMRS ports, and the respective ports maintain orthogonality so that they do not generate interference with each other using CDM or FDM.

Physical Downlink Shared Channel (PDSCH) 340: This is a data channel for downlink data. The PDSCH is used for the base station to transmit traffic to the terminal, and is transmitted using an RE on which the reference signal is not transmitted in a data region that is a region excluding a control channel region of FIG. 3.

Channel Status Information Reference Signal (CSI-RS) 320: This is a reference signal that is transmitted for terminals that belong to one cell. The CSI-RS is used to measure the channel state. A plurality of CSI-RSs may be transmitted to one cell. In the LTE-A system, one CSI-RS may correspond to one, two, four, or eight antenna ports.

Other control channels (including PHICH, PCFICH, and PDCCH) 330: This is used to provide control information that is required for the terminal to receive the PDSCH or to transmit ACK/NACK for operating HARQ for uplink data transmission.

A Physical Dedicated Control Channel (PDCCH) region that is a control channel region and an enhanced PDCCH (ePDCCH) region that uses a data channel region are divided from each other on the time axis. This is to quickly receive and demodulate the control channel signal. In addition, the PDCCH region is located over the whole downlink band in a manner that one control channel is divided into control channels of a small unit, and the small-unit control channels are dispersedly located on the whole downlink band. An uplink is briefly divided into a control channel PUCCH and a data channel PUSCH. If the data channel does not exist, a response to the downlink data channel and other feedback information are transmitted through the control channel, whereas if the data channel exists, they are transmitted through the data channel. Hereinafter, the PDCCH transmission may mean transmission of the control signal on the PDCCH, and the PDSCH transmission or the PUSCH transmission may mean transmission of the signal on the PDSCH or the PUSCH.

In this case, at least one of the control signals, control channels, and data channels may be transmitted and received using parts of SC-FDMA or OFDM symbols in uplink or downlink subframes that are used to perform LTE communications. For example, transmission/reception of the control signals or channels or data channels may be performed using the subframes or k to 13 OFDM symbols (where, k1>0), which perform transmission of the control signals or channels or data channels using 0 to k1 OFDM symbols (where, k1<13) among 14 OFDM symbols (0 to 13 OFDM symbol indexes) that constitute 1 ms subframe. In this case, the subframes that transmit and receive the control signals or channels or data channels using partial symbols in the subframe as described above may be expressed as partial subframes.

Hereinafter, preferred embodiments of the present disclosure will be described in detail with reference to the accompanying drawings. In describing the present disclosure, related well-known functions or configurations incorporated herein are not described in detail in the case where it is determined that they obscure the subject matter of the present disclosure in unnecessary detail. Further, terms to be described later are terms defined in consideration of their functions in the present disclosure, but may differ depending on intentions of a user and an operator or customs. Accordingly, they should be defined on the basis of the contents of the whole description of the present disclosure. Further, although a system that transmits and receives signals using at least one unlicensed band in a Long Term Evolution (LTE) system, an LTE-Advanced (LTE-A) system, and an LTE-A-Pro system is exemplarily described in the description of the present disclosure, the present disclosure can be applied to other communication systems that simultaneously use a licensed band and an unlicensed band or a communication system that senses a frequency band for performing the signal transmission (or measures the strength of a received signal) before the signal transmission, and performs or does not perform the signal transmission in accordance with the result of the sensing without any particular addition and subtraction. Further, in the present disclosure, a base station or a cell that performs communication using an unlicensed band may be expressed as an LAA SCell, an LAA Cell, an LAA base station, a base station, or a cell, and a terminal that performs communication using an unlicensed band may be mixedly expressed as an LAA terminal, an LAA UE, or a terminal. However, in the embodiments of the present disclosure, the above-described expressions have the same meaning.

Further, for convenience in explanation, it is assumed that the present disclosure is applied to a Carrier Aggregation (CA) environment in which at least one licensed band cell and one or more unlicensed band cells are connected through an ideal backhaul. However, the present disclosure is not limited thereto, but may be applied even to a dual-connectivity environment in which the cells are connected through a non-ideal backhaul or a stand-alone environment in which only cells that operate only in an unlicensed band are connected to each other without any licensed band cell. Further, in the present disclosure, explanation will be made on the assumption that an LAA terminal transmits an uplink control signal or channel or uplink data to an LAA cell using an unlicensed band. However, the present disclosure can also be applied to a case where an LAA cell transmits a downlink control signal or channel or downlink data to an LAA terminal using an unlicensed band.

Generally, in the unlicensed band, a plurality of devices share and use the same frequency band or channel. In this case, the devices that use the unlicensed band may use different systems. Accordingly, for mutual coexistence between various devices, the devices that operate in the unlicensed band may perform channel sensing with respect to the unlicensed band before performing communication using the unlicensed band or channel, and may perform or may not perform communication with respect to the unlicensed band in accordance with the result of the channel sensing. In this case, if the unlicensed band can be used in accordance with the result of the channel sensing, the device can continuously occupy and use the unlicensed band for a Maximum Channel Occupancy Time (MCOT) that is predefined or preconfigured.

General operations of the devices that operate in the unlicensed band are as follows. A transmission device that requires signal transmission including data or a control signal may confirm whether other devices occupy (or use) the unlicensed band or channel in which the signal transmission is performed before performing the signal transmission, and may occupy or may not occupy the channel in accordance with the confirmed channel occupation state of other devices. Such an operation is generally called Listen-Before-Talk (LBT) (or channel sensing). In other words, at least the transmission device among the devices that intend to perform communication using the unlicensed band should determine whether to occupy the channel in accordance with the predefined or preconfigured method.

In this case, in order to determine whether to occupy the unlicensed band or channel, time that is required to sense the channel may be predefined, may be configured from the transmission device or a specific device, or may be selected as an arbitrary value in a specific range. Further, the channel sensing time may be configured in proportion to the maximum channel occupation time in which the unlicensed band can be continuously occupied at maximum without any separate channel sensing operation. Further, the channel sensing time for performing the channel sensing operation may be configured in accordance with the maximum channel occupation time. In this case, at least one configuration value of the channel sensing operation may be differently configured in accordance with the unlicensed band for performing the operation or in accordance with regional or national regulations. For example, in the case of the United States, the unlicensed band can be currently used without separate channel sensing operation except for a radar sensing operation in 5 GHz frequency band.

The transmission device that intends to use the unlicensed band may sense whether other devices use the corresponding channel through the above-described channel sensing operation (or LBT), and if it is sensed that other devices do not occupy the corresponding channel, the transmission device may occupy and use the channel. At this time, the devices that use the unlicensed band may operate to predefine or configure the maximum channel occupation time for the continuous occupation after the channel sensing operation. In this case, the maximum occupation time may be predefined in accordance with regulations that are defined according to the frequency band, regional and/or national regulations, or may be separately configured from another device (e.g., in the case of the terminal, the base station). For example, in the case of Japan, the maximum occupation time in 5 GHz unlicensed band is restricted to 4 ms.

A channel occupation method in an LAA cell in order for an LAA system to use an unlicensed band is as follows. If the intensity of a signal that is received during the whole or a part of a fixed channel sensing period is higher than a predefined threshold value in the case where a channel sensing operation is performed with respect to the corresponding unlicensed band for the fixed period (e.g., 25 □s) in the LAA cell, the LAA cell determines that at least one of other devices uses the unlicensed band, and does not perform communication using the unlicensed band. If the intensity of the signal that is received during the whole of the fixed channel sensing period is lower than the predefined threshold value, the LAA cell determines that the unlicensed band is in an idle state, and thus can continuously use the unlicensed band for the maximum channel occupation period that is predefined or preconfigured.

If the intensity of the signal that is received during a part of a variable channel sensing period is higher than the predefined threshold value in the case where the channel sensing operation is performed with respect to the corresponding unlicensed band for the configured variable period in the LAA cell, the LAA cell determines that at least one of other devices uses the unlicensed band, and does not perform communication using the unlicensed band. If the intensity of the signal that is received during the whole of the variable channel sensing period is lower than the predefined threshold value, the LAA cell determines that the unlicensed band is in an idle state, and thus can continuously use the unlicensed band for the maximum channel occupation period that is predefined or preconfigured.

In this case, the variable channel sensing period may be varied through selection of an arbitrary value in a contention window that is configured or managed by the LAA cell. For example, the LAA cell may select an arbitrary variable N (e.g., in the case where a maximum value of an initial contention window is 15, the LAA cell may select an arbitrary integer N) from a channel contention window set that is selected on the basis of at least one of the kind of the signal to be transmitted by the LAA cell and the maximum channel occupation period to be maximally occupied by the LAA cell, may perform the channel sensing operation as long as the selected N period, and then may occupy and use the unlicensed band. In this case, the probability that other devices can simultaneously use the unlicensed band can be lowered by changing or initializing the contention window on the basis of the result of reception of the terminal (e.g., ACK/NACK that is transmitted by the terminal) with respect to the data signal that is transmitted through the unlicensed band. For example, if NACK generation exceeds 80% of the reception results of all terminals with respect to data signals that are transmitted from the very first subframe in the maximum channel occupation period through the unlicensed band, the LAA cell increases the contention window. If the NACK generation does not exceed 80% of the reception results of all terminals with respect to the data signals that are transmitted from the very first subframe in the maximum channel occupation period through the unlicensed band, the LAA cell configures the contention window as an initial value.

Figure 4:
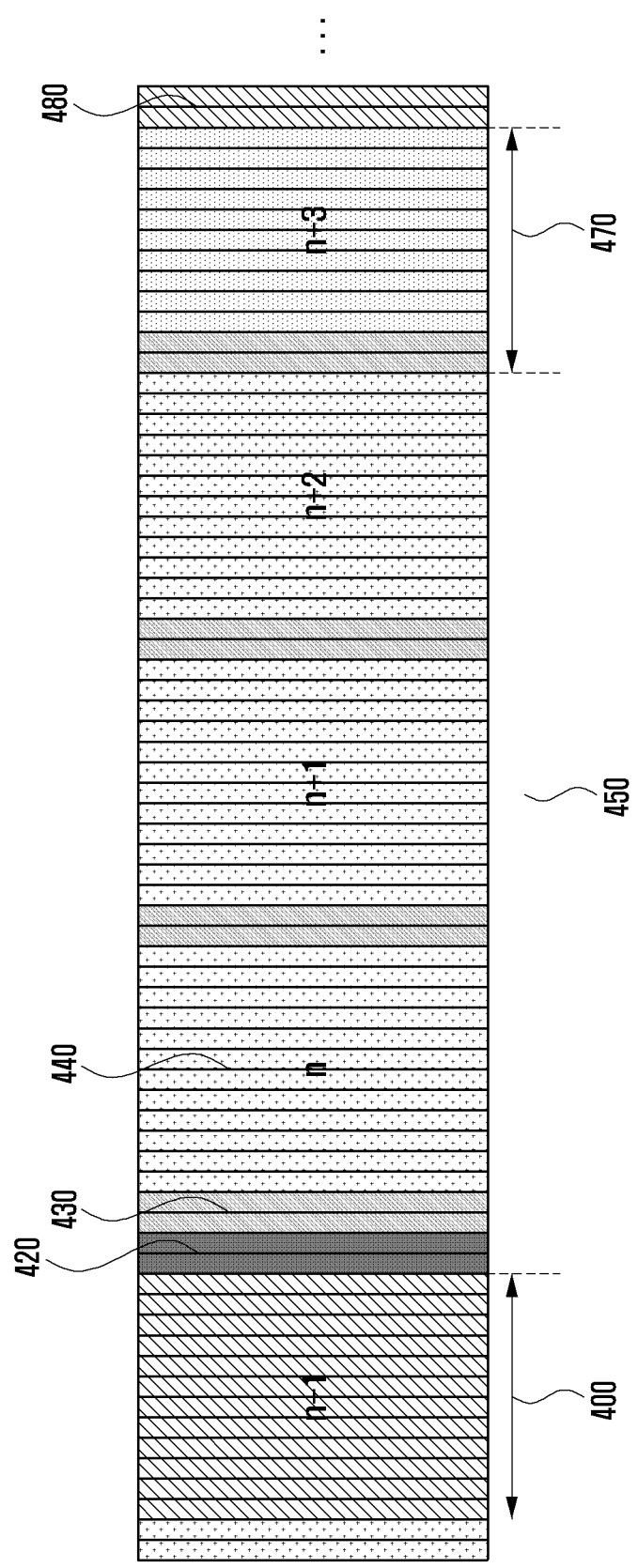
FIG. 4 is a diagram illustrating downlink channel connection in an unlicensed band of an LAA system.

FIG. 4 is a diagram illustrating an LAA downlink transmission operation.

A general LAA downlink transmission operation will now be described with reference to FIG. 4. An LAA cell that transmits a downlink signal using an unlicensed band performs channel sensing operation with respect to the unlicensed band for a time 400 that corresponds to a variable period that is arbitrarily selected in a configured contention window. If it is determined that the unlicensed band is in an idle state through the channel sensing operation, the LAA cell can occupy the unlicensed band for the maximum channel occupation period 450. In this case, if the channel sensing operation is ended before a subframe boundary or a slot boundary, the LAA cell may occupy the unlicensed band through transmission of a predefined signal 420 up to the subframe or slot boundary, and may transmit general LTE signals (e.g., a control signal 430 on PDCCH, a data signal 440 on PDSCH, and a reference signal) in a slot or subframe. In this case, the last subframe in the maximum channel occupation period may be a partial subframe 470 in accordance with an occupation start time of the unlicensed band and the maximum channel occupation period.

Figure 5:
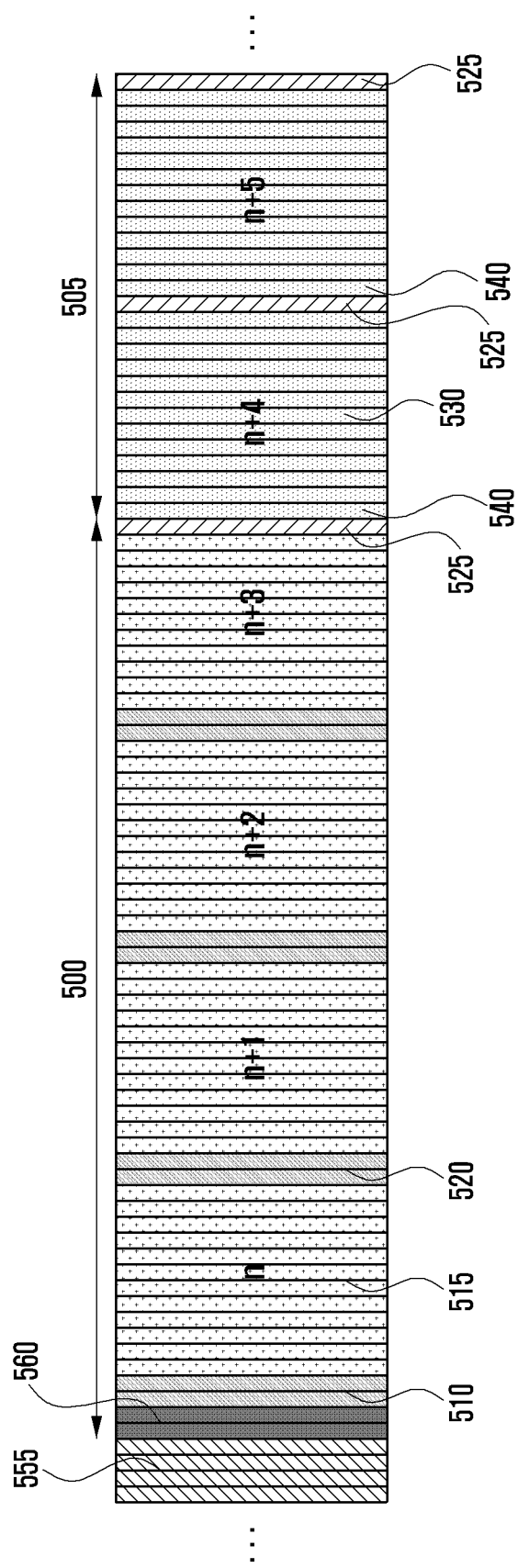
FIG. 5 is a diagram illustrating uplink channel connection in an unlicensed band of an LAA system.

FIG. 5 is a diagram illustrating an LAA uplink transmission operation.

A general LAA uplink transmission operation will now be described with reference to FIG. 5. An LAA terminal that transmits an uplink signal using an unlicensed band may receive uplink transmission configuration through control information that is transmitted onto a downlink control channel 510 in subframe n in a downlink transmission period 500 of an LAA cell, and may perform uplink transmission 530 in subframe n+4 in which the uplink transmission has been configured through the uplink transmission configuration. In this case, if the uplink transmission of the LAA terminal is uplink transmission in the unlicensed band, the LAA terminal should perform channel sensing operation before performing the configured uplink transmission 530. In this case, the channel sensing operation that is performed by the LAA terminal may be equal to the channel sensing operation that is performed by the LAA cell, or partial variables (e.g., contention window sizes) may differ from each other. Further, the channel sensing operation 525 of the LAA terminal may be performed in at least one SC-FDMA symbol 540 in the same subframe in which the uplink transmission has been configured, or may be performed in at least one SC-FDMA symbol 525 just before the configured uplink subframe. In this case, the LAA terminal may perform or may not perform the configured uplink transmission in accordance with the result of the channel sensing operation.

In an LTE system, a terminal may perform uplink data transmission in accordance with base station configuration or instructions. For example, uplink signal transmission on an uplink data channel (hereinafter referred to as "Physical Uplink Shared Channel (PUSCH)") of the terminal is performed as follows. If a base station instructs a specific terminal to perform uplink transmission through control information on a downlink control channel (hereinafter referred to as "Physical Downlink Control Channel (PDCCH)"), the terminal transmits the configured uplink signal using the time relationship between an uplink transmission configuration reception time (e.g., PDCCH reception time) that is predefined with the base station and a configured uplink signal transmission time (e.g., PUSCH transmission time). The base station may configure data or CSI (non-periodic CSI) so that the terminal transmits the configured data or CSI using the PUSCH.

For example, in the case of an FDD system, if the base station instructs the terminal to perform PUSCH transmission through the PDCCH in subframe n, the terminal performs the PUSCH transmission using resources that are configured from the base station in subframe n+K (K=4). In this case, K may be configured as a different value including 4. In the case of a TDD system, the terminal may perform PUSCH transmission using the relationship between a PDCCH reception time and a PUSCH transmission time, which includes uplink transmission configuration information that is predefined between the base station and the terminal. At this time, in the case of a system having a third frame structure except for the FDD and TDD, the time relationship that is defined in the FDD or TDD system may be reused as the time relationship between the uplink transmission configuration information reception time and the configured uplink signal transmission time, or a new time relationship between the uplink transmission configuration reception time and the configured uplink signal transmission time may be defined for the system having the third frame structure.

Similarly in the LTE system, the terminal may transmit Uplink Control Information (UCI) to the base station using at least one of a Physical Uplink Control Channel (PUCCH) and PUSCH that are determined by at least one standard including the kind of the UCI and base station/terminal configuration in accordance with the base station configuration or instructions. Here, the UCI information may be composed of one or more of HARQ-ACK, periodic CSI, non-periodic CSI, and scheduling request information. For example, the terminal may periodically report Channel State Information (CSI) to the base station through the PUCCH in accordance with a period that the base station has configured as an upper signal. If the base station instructs the terminal to non-periodically report the CSI through the PDCCH, the terminal may report the measured CSI to the base station through the PUSCH that is configured by the PDCCH.

The base station and the terminal that are described in the present disclosure relate to a base station and a terminal that can transmit/receive signals from one or more cells that operate in a licensed band or an unlicensed band, and may also include a base station and a terminal that can transmit/receive signals from one or more cells through the licensed band, and a base station that can transmit signals to one or more cells through the unlicensed band and a terminal that can receive a signal from one or more cells through the unlicensed band. Unless separately explained, it is assumed that the terminal and the base station that are described in the present disclosure are configured to transmit/receive signals from one or more cells. In this case, explanation will be made on the assumption that the configured cells are composed of cells that operate in at least one licensed band and cells that operate in at least one unlicensed band. In this case, the present disclosure can be applied even to a base station and a terminal that operate only in the unlicensed band without separate licensed band.

Further, it is assumed that the cell that operates in the licensed band, or the base station and the terminal, which are described in the present disclosure, are configured and operate in at least one duplex type of FDD (or frame structure type 1) and TDD (or frame structure type 2). Similarly, it is assumed that the cell that operates in the licensed band, or the base station and the terminal, which are described in the present disclosure, are configured and operate in the third frame structure (or frame structure type 3). Here, the frame structure type 3 includes a frame structure that the channel sensing operation requires, and is structured so that all subframes can be configured as a downlink or an uplink. Accordingly, the downlink and uplink periods can be freely changed within a range that is permitted by the technology or regulations in accordance with the base station configuration.

Further, the method that is proposed in the present disclosure is not limited to respective embodiments, but can be applied to all embodiments described in the present disclosure.

Hereinafter, a method for a terminal that can transmit/receive signals with one or more cells that operate in a licensed band to transmit UCI will be described.

UCI transmission cells may be changed in accordance with at least one condition of the kind of UCI information (or UCI) (e.g., HARQ-ACK, Periodic CSI information (P-CSI), non-periodic CSI information (A-CSI), Scheduling Request (SR) information), which is transmitted in subframe n by the terminal in which simultaneous transmission of PUCCH and PUSCH has been configured or has not been configured, whether to transmit PUSCH at UCI transmission time (or in subframe n), the kind of PUSCH transmission cells, and cell indexes of PUSCH transmission cells.

Next, a UCI transmission method of a terminal in which simultaneous transmission of PUCCH and PUSCH has not been configured will be described.

For example, if there is not the configured PUSCH transmission at the UCI transmission time, the UCI (composed of at least one of HARQ-ACK, periodic CSI information, SR, and RI) is transmitted through PUCCH of PCell. In this case, since it is assumed that the non-periodic CSI is transmitted through the PUSCH, it may be excluded from the PUCCH transmission.

If the UCI information that is transmitted in subframe n includes non-periodic CSI or non-periodic CSI and HARQ-ACK information, the UCI information is transmitted from the base station through the PUSCH that is configured through the PDCCH. In this case, the base station configures CSI information report request and PUSCH resources for the terminal to transfer the CSI information report to the terminal through the PDCCH. If PUSCH transmission for data transmission has been configured at UCI information transmission time in the terminal, the UCI information may be included (embedded or multiplexed) in the PUSCH transmission for the data transmission to be transmitted. In this case, the PUSCH for the CSI information request and the PUSCH for the data transmission may be configured through one PDCCH, or may be respectively configured through separate PDCCHs.

If the UCI information that is transmitted in subframe n includes one of periodic CSI, HARQ-ACK, and periodic CSI and HARQ-ACK information, and the PUSCH transmission in PCell is configured at the UCI transmission time, the UCI information to be transmitted may be included in the PUSCH transmission of PCell. In this case, if the PUSCH transmission in the PCell is information that is transmitted during an initial cell connection process, the UCI information may not be transmitted.

If the UCI information that is transmitted in subframe n includes one of periodic CSI, HARQ-ACK, and periodic CSI and HARQ-ACK information, and the PUSCH transmission in PCell is not configured at the UCI transmission time, but the PUSCH is configured in at least one SCell, the UCI information to be transmitted may be included in the PUSCH transmission of the SCell having the smallest SCellIndex among SCells in which the PUSCH transmission has been configured.

Hereinafter, a UCI transmission method of a terminal in which simultaneous transmission of PUCCH and PUSCH has been configured will be described.

If the UCI information that is transmitted in subframe n includes at least one of HARQ-ACK and/or SR, the UCI information may be transmitted using at least one of PUCCH formats 1/1a/1b/3 in accordance with the UCI information and the base station configuration. Here, detailed information on the respective PUCCH formats that are described in the present disclosure refers to the latest 3GPP TS36.211, TS36.212, and TS36.213 standards.

If the UCI information that is transmitted in subframe n includes at least one of HARQ-ACK and/or SR and/or periodic CSI information, the UCI information may be transmitted using at least one of PUCCH formats 4/5 in accordance with the UCI information and the base station configuration.

If the UCI information that is transmitted in subframe n includes periodic CSI information for one serving cell, the UCI information may be transmitted through PUCCH format 2.

If the UCI information that is transmitted in subframe n is composed of periodic CSI information and HARQ-ACK and PUSCH transmission in another cell is not configured, the UCI information may be transmitted using at least one of PUCCH formats 2a/2b/3/4/5 in accordance with the UCI information.

If the UCI information that is transmitted in subframe n is composed of periodic CSI information and HARQ-ACK and PUSCH transmission in PCell is configured in subframe n, the HARQ-ACK of the UCI information may be transmitted using at least one of PUCCH formats 1a/1b/3 in accordance with the UCI information, and the periodic CSI information may be transmitted through the PUSCH of the PCell.

If the UCI information that is transmitted in subframe n is composed of periodic CSI information and HARQ-ACK, and the PUSCH transmission in PCell is not configured in subframe n, but the PUSCH transmission is configured in at least one SCell, the HARQ-ACK of the UCI information may be transmitted using at least one of PUCCH formats 1a/1b/3 in accordance with the UCI information, and the periodic CSI information may be transmitted through the PUSCH of the SCell having the smallest SCellIndex among SCells in which the PUSCH transmission has been configured in subframe n.

If the UCI information that is transmitted in subframe n is composed of non-periodic CSI information and HARQ-ACK, or non-periodic CSI information and HARQ-ACK and SR, or non-periodic CSI information and SR, the HAEQ-ACK of the UCI information, or the HARQ-ACK and the SR, or the SR may be transmitted using at least one of PUCCH formats 1/1a/1b/3 in accordance with the UCI information, and the non-periodic CSI information may be transmitted through the transmission-configured PUSCH.

In the present disclosure, the terminal is configured to transmit the PUCCH in one or more PUCCH groups or one or more cells, and the PUCCH transmission cell may be not only a cell that operates in the licensed band but also a cell (PCell, PSCell, or SCell) that operates in the unlicensed band.

Further, in the present disclosure, it is assumed that cells that operate in the unlicensed band operate using different channels (that may be understood as frequency bands) in the unlicensed band. However, the present disclosure may also be applicable to a case where different cells operate using the same unlicensed band channel. Further, in relation to the UCI transmission that is described in the present disclosure, it is basically assumed that in the case where a simultaneousAckNackAndCQI field is configured as TRUE in the terminal, or simultaneous transmission of HARQ-ACK and CSI (CQI/PMI) is configured, the terminal simultaneously transmits HARQ-ACK and CQI/PMI. Further, in the case where transmission of HARQ-ACK and CSI (CQI/PMI) information should be simultaneously performed in the terminal in which the simultaneousAckNackAndCQI field is not configured as TRUE, it is basically assumed that the terminal does not transmit the CSI, but transmits the HARQ-ACK information.

In the terminal that is configured to transmit the PUCCH in one or more cells (e.g., terminal in which PUCCH transmission in PCell and PUCCH transmission in PSCell or SCell have been configured), PUCCH transmission group may be discriminated on the basis of a PUCCH transmission cell. In this case, one cell in the PUCCH transmission group may be configured as a PUCCH transmission cell. For example, if it is assumed that four cells, such as PCell, SCell1, SCell2, and SCell3, are configured in the terminal, and maximally two of the configured PUCCH transmission cells are configured in the terminal, the PCell to which the PUCCH is basically transmitted is configured as the PUCCH transmission cell. One or more cells that include the PCell may be configured in one PUCCH group (or primary PUCCH group), and one or more cells that include the SCell in which the PUCCH transmission has been configured among the cells that are not included in the primary PUCCH group may be configured as another PUCCH group (secondary PUCCH group).

For example, in the case where two PUCCH transmission cells are configured and PCell and SCell2 are configured as the PUCCH transmission cells, PCell and SCell1 may be configured in one group (primary PUCCH group), and SCell2 and SCell3 may be configured in another PUCCH group (secondary PUCCH group). In this case, the PUCCH is always transmitted in the PCell among the cells of the PUCCH group in which the PCell is included. In the PUCCH group in which the PCell is not included, a specific cell, for example, SCell2, may be configured as the PUCCH transmission cell (PUCCH-SCell) in accordance with the base station configuration. In this case, UCI information on PCell and SCell1 may be transmitted through the PUCCH, and UCI information on SCell2 and SCell3 may be transmitted through the PUCCH of the SCell2 that is configured as the PUCCH-SCell.

In the present disclosure, for convenience in explanation, two different PUCCH cell groups (or two PUCCH transmission cell configurations) are assumed. However, even in the case of configuring two or more PUCCH cell groups, various methods that are described in the present disclosure may be applied. In the present disclosure, one of two different PUCCH cell groups that includes PCell is expressed as a first PUCCH cell group, and the other of two different PUCCH cell groups that does not include the PCell is expressed as a second PUCCH cell group. In this case, each of the PUCCH groups may be composed of at least one SCell, and PUCCH transmission of the cells that belong to one PUCCH group is performed in the cell that is configured as the PUCCH transmission cell in the PUCCH group.

Further, in the case where there is no separate description in the present disclosure, it is assumed that PCell is a cell that operates in the licensed band, and the PUCCH transmission in the PCell is expressed as PUCCH or PUCCH-PCell. However, even in the case of the PCell that operates in the unlicensed band, the method that is described in the present disclosure can be applied. Further, the PUCCH-SCell that is expressed in the present disclosure may be dividedly explained as SCell (PUCCH-SCell) that is a cell in which the PUCCH transmission has been configured and operates in the licensed band and SCell (PUCCH-LAA-SCell) that operates in the unlicensed band. However, even in the case of mixedly using them, they can be dividedly analyzed in accordance with the point of argument that is described in the present disclosure. In the case where there is no separate description in the present disclosure, it is assumed that PCell of the first PUCCH group that operates in the licensed band and SCell of the second PUCCH group that operates in the unlicensed band are configured as the PUCCH transmission cells of the respective groups in the terminal.

Further, the present disclosure relates to a base station and a terminal that can transmit/receive signals using one or more cells that operate in a licensed band or an unlicensed band, and particularly relates to a terminal that is configured to add and activate the cells in order to perform uplink signal transmission from the base station to at least one licensed band or unlicensed band cell. In particular, the present disclosure relates to a case where the terminal receives configuration of two or more PUCCH transmission cells from the base station, and at least one of the configured PUCCH transmission cells is configured as a cell that operates in the unlicensed band.

If at least one of the PUCCH transmission cells that are configured from the terminal to the base station is a cell that operates in the unlicensed band, the PUCCH in the PUCCH transmission cell (or PUCCH-LAA-SCell) can be transmitted or cannot be transmitted in accordance with the channel sensing operation (or channel sensing) result in the unlicensed band in which the cell operates. In other words, the terminal, which intends to perform UCI transmission with respect to at least one of cells in the second PUCCH group without separate uplink data channel transmission in subframe n, determines whether other devices occupy channels with respect to the unlicensed band based on various cases where the intensity of the signal that is received through the channel sensing operation is configured from the base station or is higher than a predefined threshold value, and a predefined signal is detected. If it is determined that the unlicensed band is in an idle state as the result of performing the channel sensing operation in the unlicensed band with respect to the PUCCH-LAA-SCell, the terminal may perform the PUCCH transmission of which the transmission has been configured in the PUCCH-LAA-SCell. If it is determined that the unlicensed band is occupied by other devices in accordance with the result of the channel sensing operation with respect to the PUCCH-LAA-SCell, the terminal may perform the PUCCH transmission that is configured with respect to the PUCCH-LAA-SCell.

In this case, if the terminal requires UCI transmission in subframe n, at least one of UCI information that is transmitted in subframe n, channel or transmission cell in which UCI is transmitted, and resource allocation method for UCI information may be differently determined in accordance with at least one condition of whether to configure PUCCH-PUSCH simultaneous transmission from the base station, the kind of UCI information to be transmitted, and whether to configure PUSCH transmission in subframe n. Further, at least one of PUCCH transmission cells that are configured in the terminal in which one or more PUCCH transmission cells have been configured is configured as a cell that operates in the unlicensed band, and if the UCI transmission is required in subframe n, at least one of UCI information that is transmitted in subframe n, channel or transmission cell in which UCI is transmitted, and resource allocation method for UCI information may be differently determined in accordance with at least one condition of whether to configure PUCCH-PUSCH simultaneous transmission from the base station, the kind of UCI information to be transmitted, whether to configure PUSCH transmission in subframe n, the result of channel sensing operation for the PUCCH transmission cells, and channel sensing operation for the cell in which uplink transmission has been configured among unlicensed band cells that are included in a PUCCH group (the second PUCCH group) in which the PUCCH transmission cells are included. Accordingly, the present disclosure proposes a method for more efficiently performing UCI transmission in the terminal.

Embodiment 1

Hereinafter, in the present disclosure, it is assumed that in a terminal in which one or more PUCCH transmission cells have been configured and PUCCH-PUSCH simultaneous transmission has not been configured, at least one of the PUCCH transmission cells is configured as a cell that operates in an unlicensed band, and UCI (e.g., the whole or a part of periodic CSI information, non-periodic CSI information, HARQ-ACK information, and scheduling request information) transmission for a PUCCH group (or the second PUCCH group) that is composed of cells that perform PUCCH transmission to the PUCCH transmission cell (hereinafter referred to as "PUCCH transmission cell") that operates in the configured unlicensed band is required in subframe n. A UCI transmission method that is proposed in the present disclosure will be described as follows. In this case, the method that is proposed in the present disclosure can be applied to all embodiments described in the present disclosure.

First, a case where PUSCH transmission for the unlicensed band PUCCH transmission cell has been configured will be described. A case where UCI to be transmitted is composed of one of periodic CSI information, HARQ-ACK, and periodic CSI information and HARQ-ACK will be described. Regardless of whether to configure PUSCH transmission for cells that are included in the group (the second PUCCH group) for the PUCCH transmission cells, the terminal performs channel sensing operation for the unlicensed band PUCCH transmission cell before a PUSCH transmission time that is configured in the PUCCH transmission cell in subframe n, and if it is determined that the unlicensed band is an idle channel, the terminal then transmits UCI that is included (or embedded or multiplexed) in the PUSCH that is configured in the PUCCH cell. If it is determined that the unlicensed band is not an idle channel after the channel sensing operation for the unlicensed band PUCCH transmission cell, the terminal may not perform uplink transmission in subframe n, or may transmit the UCI through the PUCCH of PCell. In this case, if the PUSCH transmission includes information on initial random access of the terminal, the UCI is not transmitted.

Next, a case where the UCI to be transmitted is composed of one of periodic CSI information, HARQ-ACK, and periodic CSI information and HARQ-ACK, and PUSCH transmission is configured for the cell that operates in at least one licensed band among the cells included in the group (the second PUCCH group) for the PUCCH transmission cells will be described. Regardless of the result of the channel sensing operation for the PUCCH transmission cells in subframe n, the terminal does not perform the channel sensing operation for the PUCCH transmission cell, but may transmit the UCI information that is included in the PUSCH in the cell having the smallest SCellIndex among the cells in the licensed band in which the PUSCH transmission has been configured in subframe n.

Next, a case where UCI to be transmitted is composed of one of periodic CSI information, HARQ-ACK, and periodic CSI information and HARQ-ACK, and PUSCH transmission is configured for the cell that operates in at least one unlicensed band among the cells included in the group (the second PUCCH group) for the PUCCH transmission cells will be described. The terminal performs channel sensing operation for the unlicensed band PUCCH transmission cell before a PUSCH transmission time that is configured in the PUCCH transmission cell in subframe n, and if it is determined that the unlicensed band is an idle channel, the terminal then transmits UCI that is included (or embedded or multiplexed) in the PUSCH that is configured in the PUCCH cell. Further, the terminal performs the channel sensing operation for the unlicensed band PUSCH transmission cell before the PUSCH transmission time that is configured in the PUSCH transmission cells in subframe n, and if the PUCCH transmission cell is included in the cells in which it is determined that the unlicensed band is an idle channel, the terminal then transmits the UCI that is included (or embedded or multiplexed) in the PUSCH that is configured in the PUCCH cell. Further, the terminal performs the channel sensing operation for the unlicensed band PUSCH transmission cell before the PUSCH transmission time that is configured in the PUSCH transmission cell in subframe n, and if it is determined that the PUCCH transmission cell is not included in the cells in which it is determined that the unlicensed band is an idle channel, but the cell in which the PUSCH transmission has been configured is included therein, the terminal then transmits the UCI that is included (or embedded or multiplexed) in the PUSCH that is configured in the cell having the smallest SCellIndex among the cells in which it is determined that the unlicensed band is an idle channel or in the cell in which it is first determined that the unlicensed band is an idle channel. If it is determined that the unlicensed band is not an idle channel after the channel sensing operation for the unlicensed band PUCCH transmission cell, or if it is determined that the unlicensed band of the PUCCH transmission cell and the PUSCH transmission cell is not an idle channel, the terminal may not perform the uplink transmission in subframe n or may transmit the UCI through the PUCCH of the PCell. In this case, if the PUSCH transmission includes information on initial random access of the terminal, the UCI is not transmitted.

Next, a case where PUSCH transmission for the unlicensed band PUCCH transmission cell has not been configured will be described.

If the PUSCH transmission for the cell that is included in the group (the second PUCCH group) for the PUCCH transmission cell has not been configured, the terminal performs channel sensing operation for the unlicensed band PUCCH transmission cell before the PUCCH transmission time in subframe n. Then, if it is determined that the unlicensed band is an idle channel, the terminal transmits UCI through PUCCH that is configured in the PUCCH cell. In this case, the UCI is composed of periodic CSI and/or HARQ-ACK and/or SR. If it is determined that the unlicensed band is not an idle channel after the channel sensing operation for the unlicensed band PUCCH transmission cell, the terminal may not transmit the UCI through the PUCCH that is configured in subframe n or may transmit the UCI through the PUCCH of the PCell.

Next, a case where PUSCH transmission for the cell that operates in the unlicensed band among the cells that are included in the group (the second PUCCH group) for the PUCCH transmission cell has not been configured, but PUSCH transmission for the cell that operates in at least one licensed band has been configured will be described. The UCI information is composed of periodic CSI, HARQ-ACK, or periodic CSI and HARQ-ACK. The terminal may transmit the UCI information that is included in the PUSCH that is configured in the cell having the smallest SCellIndex among the cells of the licensed band in which the PUSCH transmission has been configured in subframe n. In this case, if the UCI information is composed of a non-periodic CSI information report, the terminal may transmit the UCI through the PUSCH in the licensed band cell that is configured for the non-periodic CSI information report.

Next, a case where UCI to be transmitted is composed of one of periodic CSI information, HARQ-ACK, and periodic CSI information and HARQ-ACK, and PUSCH transmission is not configured for the cell that operates in the licensed band among the cells that are included in the group (the second PUCCH group) for the PUCCH transmission cells, but PUSCH transmission for the cell that operates in at least one unlicensed band will be described. The terminal performs channel sensing operation for the unlicensed band PUCCH transmission cell before a PUCCH transmission time that is configured in the PUCCH transmission cell in subframe n, and if it is determined that the unlicensed band is an idle channel, the terminal then transmits UCI through PUCCH of a PUCCH cell. Further, the terminal performs the channel sensing operation for the unlicensed band PUSCH transmission cell before the PUSCH transmission time that is configured in the respective cells in which the PUSCH transmission has been configured, and if it is determined that at least one cell is an idle channel, the terminal then transmits the UCI that is included (or embedded or multiplexed) in the PUSCH that is configured in the cell having the smallest SCellIndex among the cells that are determined as the idle channels or in the cell in which it is first determined that the unlicensed band is an idle channel (among the cells in which the PUSCH transmission has been configured). If it is determined that the unlicensed band is not an idle channel in all of the PUCCH transmission cell and the PUSCH transmission cells, the terminal may not perform the uplink transmission in subframe n or may transmit the UCI through the PUCCH of the PCell.

Next, a case where PUSCH transmission for the cell that operates in at least one licensed band and PUSCH transmission for the cell that operates in at least one unlicensed band among the cells that are included in the group (the second PUCCH group) for the PUCCH transmission cell have been configured, and the UCI information is composed of periodic CSI, HARQ-ACK, or periodic CSI and HARQ-ACK will be described. The terminal may transmit the UCI information that is included in the configured PUSCH in the cell having the smallest SCellIndex among the cells of the licensed band in which the PUSCH transmission has been configured in subframe n. In this case, if the UCI information is composed of non-periodic CSI information and the cell that is configured for the non-periodic CSI information report is the cell that operates in the licensed band, the terminal may transmit the UCI through the PUSCH in the configured licensed band cell. If the UCI information is composed of the non-periodic CSI information and the cell that is configured for the non-periodic CSI information report is the cell that operates in the unlicensed band, the terminal performs the channel sensing operation for the unlicensed band cell before the PUSCH transmission of the configured unlicensed band cell, and if it is determined that the unlicensed band is an idle channel, the terminal performs UCI transmission through the PUSCH of the cell that is configured for the non-periodic CSI information report in subframe n. If it is determined that the unlicensed band is not an idle channel, the terminal does not perform UCI transmission in subframe n.

Embodiment 2

Hereinafter, in the present disclosure, it is assumed that in a terminal in which one or more PUCCH transmission cells have been configured and PUCCH-PUSCH simultaneous transmission has been configured, at least one of the configured PUCCH transmission cells is configured as a cell that operates in an unlicensed band, and UCI (e.g., UCI information of at least one of periodic CSI, HARQ-ACK, scheduling request, periodic CSI and HARQ-ACK, HARQ-ACK and scheduling request, non-periodic CSI and HARQ-ACK, non-periodic CSI and scheduling request, or non-periodic CSI and HARQ-ACK and scheduling request) transmission for a PUCCH group (or the second PUCCH group) that is composed of cells that perform PUCCH transmission to the PUCCH transmission cell (hereinafter referred to as "PUCCH transmission cell") that operates in the configured unlicensed band is required in subframe n. A UCI transmission method that is proposed in the present disclosure will be described as follows. In this case, the method that is proposed in the present disclosure can be applied to all embodiments described in the present disclosure. In this case, if the periodic CSI and non-periodic CSI information reports occur simultaneously, the terminal may give preference to the non-periodic CSI information report without reporting the periodic CSI information, or may give preference to the periodic CSI without reporting the non-periodic CSI information.

Next, a case where PUSCH transmission in subframe n for the cell that operates in the licensed band among the cells that are included in the group (the second PUCCH group) for the configured unlicensed band PUCCH transmission cell has not been configured, but PUSCH transmission for the cell that operates in at least one unlicensed band has been configured will be described. If it is determined that an unlicensed band channel of at least one of the cells is in an idle state after the channel sensing operation for the PUCCH cell and/or PUSCH cell, a UCI transmission method of the terminal is determined in accordance with the cell in which it is determined that the unlicensed band channel is an idle channel, the kind of the UCI, and whether to transmit the PUSCH, and thus the present disclosure proposes a correct UCI transmission method of the terminal in the above-described case.

For example, if the PUSCH transmission has not been configured in the cell that operates in the licensed band among the cells that are included in the group for a unlicensed band PUCCH transmission cell at a UCI information transmission time, the terminal may or may not transmit the UCI information in accordance with the result of the channel sensing operation in the reference cell on the basis of one of the PUCCH cell and the unlicensed band cell in which the PUSCH transmission has been configured. As another example, if the PUSCH transmission has been configured in the cell that operates in at least one licensed band among the cells that are included in the group for the unlicensed band PUCCH transmission cell at the UCI information transmission time, the terminal transmits the UCI information that is included in the cell having the smallest SCellIndex among the licensed band cells. Hereinafter, the above-described case will be described in more detail.

A case where the PUSCH transmission in subframe n has not been configured for the configured unlicensed band PUCCH transmission cells that are included in the group (the second PUCCH group) in the terminal that performs UCI (e.g., periodic CSI, HARQ-ACK, scheduling request, or periodic CSI and HARQ-ACK) transmission in subframe n will be described. If it is determined that the channel for the PUCCH cell is in an idle state after the channel sensing operation for the PUCCH cell, the terminal may transmit the whole or a part of the UCI through the PUCCH that is configured in the PUCCH cell. If it is determined that the channel for the PUCCH cell among the cells is not in an idle state after the channel sensing operation for the PUCCH cell, the terminal may not transmit the UCI information to the PUCCH cell, or may transfer the UCI information through the PUCCH of the PCell.

Next, a case where PUSCH transmission in subframe n for the cell that operates in the licensed band among the cells that are included in the group (the second PUCCH group) for the configured unlicensed band PUCCH transmission cell has not been configured, but PUSCH transmission for the cell that operates in at least one unlicensed band has been configured in the terminal that performs UCI (e.g., periodic CSI, HARQ-ACK, scheduling request, or periodic CSI and HARQ-ACK) transmission in subframe n will be described. If it is determined that only the channel for the PUCCH cell among the above-described cells is in an idle state after the channel sensing operation for the PUCCH cell and the PUSCH cell, and the PUSCH transmission in the PUCCH channel has not been configured, the terminal may transmit the whole or a part of the UCI information through the PUCCH that is configured in the PUCCH cell.

Next, a case where PUSCH transmission in subframe n for the cell that operates in the licensed band among the cells that are included in the group (the second PUCCH group) for the configured unlicensed band PUCCH transmission cell has not been configured, but PUSCH transmission for the cell that operates in at least one unlicensed band has been configured in the terminal that performs UCI (e.g., periodic CSI and HARQ-ACK) transmission in subframe n will be described. If it is determined that only the channel for the PUCCH cell among the above-described cells is in an idle state after the channel sensing operation for the PUCCH cell and the PUSCH cell, and the PUSCH transmission in the PUCCH channel has been configured, the terminal may transmit the periodic CSI that is included in the PUSCH that is configured in the PUCCH cell, and may transmit the UCI information that excludes the periodic CSI through the PUSCH that is configured in the PUCCH cell. If the transmission of the PUSCH that is configured in the PUCCH cell is signal transmission for an initial access of the terminal, the UCI is not transmitted.

Next, a case where PUSCH transmission in subframe n for the cell that operates in the licensed band among the cells that are included in the group (the second PUCCH group) for the configured unlicensed band PUCCH transmission cell has not been configured, but PUSCH transmission for the cell that operates in at least one unlicensed band has been configured in the terminal that performs UCI (e.g., periodic CSI, HARQ-ACK, scheduling request, or periodic CSI and HARQ-ACK) transmission in subframe n will be described. If it is determined that the channel for the PUCCH cell among the above-described cells is not in an idle state after the channel sensing operation for the PUCCH cell and the PUSCH cell, but the channel for at least one PUSCH transmission cell is in an idle state, the terminal may transmit at least the periodic CSI, HARQ-ACK, and periodic CSI and HARQ-ACK information of the UCI information that is included in the PUSCH that is configured in the cell having the smallest SCellIndex among the PUSCH cells in which it is determined that the channel is in the idle state, the cell in which it is most quickly determined that the channel is in the idle state, or the cell having the smallest SCellIndex among the cells in which it is most quickly determined that the channel is in the idle state.

Next, a case where PUSCH transmission in subframe n for the cell that operates in the licensed band among the cells that are included in the group (the second PUCCH group) for the configured unlicensed band PUCCH transmission cell has not been configured, but PUSCH transmission for the cell that operates in at least one unlicensed band has been configured in the terminal that performs UCI (e.g., periodic CSI, HARQ-ACK, scheduling request, or periodic CSI and HARQ-ACK) transmission in subframe n will be described. If it is determined that the channel for at least one PUSCH transmission cell including the PUCCH cell among the above-described cells is in an idle state after the channel sensing operation for the PUCCH cell and the PUSCH cell, and the PUSCH transmission in the PUCCH transmission cell has not been configured, the terminal may transmit at least the periodic CSI, HARQ-ACK, and periodic CSI and HARQ-ACK information of the UCI information that is included in the PUSCH that is configured in the cell having the smallest SCellIndex among the PUSCH cells in which it is determined that the channel is in the idle state, the cell in which it is most quickly determined that the channel is in the idle state, or the cell having the smallest SCellIndex among the cells in which it is most quickly determined that the channel is in the idle state. Further, the terminal may transmit only the periodic CSI information of the UCI information that is included in the PUSCH that is configured in the cell having the smallest SCellIndex among the PUSCH cells in which it is determined that the channel is in the idle state, the cell in which it is most quickly determined that the channel is in the idle state, or the cell having the smallest SCellIndex among the cells in which it is most quickly determined that the channel is in the idle state, and may transmit the whole or a part of the UCI information that excludes the periodic CSI information through the PUCCH that is configured in the PUCCH cell.

Next, a case where PUSCH transmission in subframe n for the cell that operates in the licensed band among the cells that are included in the group (the second PUCCH group) for the configured unlicensed band PUCCH transmission cell has not been configured, but PUSCH transmission for the cell that operates in at least one unlicensed band has been configured in the terminal that performs UCI (e.g., periodic CSI, HARQ-ACK, scheduling request, or periodic CSI and HARQ-ACK) transmission in subframe n will be described.

If it is determined that the channel for at least one PUSCH transmission cell including the PUCCH cell among the above-described cells is in an idle state after the channel sensing operation for the PUCCH cell and the PUSCH cell, and the PUSCH transmission in the PUCCH transmission cell has been configured, the terminal may transmit the periodic CSI information of the UCI information that is included in the PUSCH that is configured in the PUCCH cell, and may transmit the whole or a part of the UCI information that excludes the periodic CSI information through the PUCCH that is configured in the PUCCH cell. In this case, it is also possible to transmit the UCI information that is entirely included in the PUSCH that is configured in the PUCCH cell. If the transmission of the PUSCH that is configured in the PUCCH cell is signal transmission for an initial access of the terminal, the UCI is not transmitted.

Next, a case where PUSCH transmission for non-periodic CSI transmission in subframe n for the cells that are included in the group (the second PUCCH group) for a configured unlicensed band PUCCH transmission cell has been configured with respect to the unlicensed band cell in the terminal that performs UCI (e.g., non-periodic CSI, HARQ-ACK, scheduling request, or periodic CSI and HARQ-ACK) transmission in subframe n will be described. If it is determined that only the channel for the PUCCH cell is in an idle state after the channel sensing operation for the PUCCH cell and the PUSCH cell, the terminal may transmit the whole or a part of the UCI information that excludes the non-periodic CSI information through the PUCCH that is configured in the PUCCH cell. If it is determined that the channel for the PUCCH cell is not in an idle state, but the PUSCH transmission cell for the non-periodic CSI transmission is in an idle state after the channel sensing operation for the PUCCH cell and the PUSCH cell, the terminal may transmit only the non-periodic CSI information through the PUSCH that is configured in the PUSCH transmission cell, and may transmit the whole or a part of the remaining UCI information that excludes the scheduling request information through the PUSCH that is configured in the PUSCH transmission cell.

Next, a case where PUSCH transmission for the cell that operates in at least one licensed band among the cells that are included in the group (the second PUCCH group) for the configured unlicensed band PUCCH transmission cell has been configured in the terminal that performs UCI transmission in subframe n will be described. The UCI may be transmitted from one of the licensed band cells in which the PUSCH transmission has been configured, for example, from a cell having the smallest SCellIndex among the licensed band cells in which the PUSCH transmission has been configured. More detailed operation thereof is as follows.

Next, a case where PUSCH transmission for the cell that operates in at least one licensed band among the cells that are included in the group (the second PUCCH group) for the configured unlicensed band PUCCH transmission cell has been configured in the terminal that performs UCI (e.g., periodic CSI, HARQ-ACK, scheduling request, periodic CSI and HARQ-ACK, or HARQ-ACK and scheduling request) transmission in subframe n will be described. Regardless of determination of whether the unlicensed band cell is an idle channel, the terminal may transmit the whole or a part of the UCI information that excludes at least the scheduling request that is included in the PUSCH that is configured in the cell having the smallest SCellIndex among the licensed band cells in which the PUSCH transmission has been configured. If it is determined that only the channel for the PUCCH cell among the above-described cells is in an idle state after the channel sensing operation for the PUCCH cell and the PUSCH cell, and the PUSCH transmission in the PUCCH cell has not been configured, the terminal may transmit a part (e.g., periodic CSI information) of the UCI information that is included in the PUSCH that is configured in the cell having the smallest SCellIndex among the licensed band cells in which the PUSCH transmission has been configured, and may transmit the UCI information excluding the information that has been transmitted to the licensed band cells (e.g., HARQ-ACK, scheduling request, or HARQ-ACK and scheduling request) through the PUCCH that is configured in the PUCCH cell. In this case, the kind of the UCI that is transmitted through the licensed band cell and the PUCCH cell may be merely exemplary, and it is also possible to transmit other UCI that is different from that as described above to the licensed band cell and the PUCCH cell.

If it is determined that only the channel for the PUCCH cell among the above-described cells is in an idle state after the channel sensing operation for the PUCCH cell and the PUSCH cell, and the PUSCH transmission in the PUCCH cell has been configured, the terminal may transmit a part (e.g., periodic CSI information) of the UCI information that is included in the PUSCH that is configured in the cell having the smallest SCellIndex among the licensed band cells in which the PUSCH transmission has been configured, and may transmit the UCI information excluding the information that has been transmitted to the licensed band cells (e.g., HARQ-ACK, scheduling request, or HARQ-ACK and scheduling request) through the PUCCH that is configured in the PUCCH cell. Further, the terminal may transmit a part (e.g., periodic CSI information) of the UCI information that is included in the PUSCH transmission that is configured in the PUCCH cell, and may transmit the UCI information excluding the information that is included in the PUSCH transmission to be transmitted (e.g., HARQ-ACK, scheduling request, or HARQ-ACK and scheduling request) through the PUCCH that is configured in the PUCCH cell. In this case, it is also possible to transmit the UCI information that is entirely included in the PUSCH that is configured for the PUCCH cell. If the transmission of the PUSCH that is configured in the PUCCH cell is signal transmission for an initial access of the terminal, the UCI is not transmitted. In this case, the kind of the UCI that is transmitted through the licensed band cell and the PUCCH cell may be merely exemplary, and it is also possible to transmit other UCI that is different from that as described above to the licensed band cell and the PUCCH cell.

Next, a case where PUSCH transmission for the non-periodic CSI transmission in subframe n for the cells that are included in the group (the second PUCCH group) for configured unlicensed band PUCCH transmission cell has been configured with respect to the licensed band cell in the terminal that performs UCI (e.g., non-periodic CSI, HARQ-ACK, scheduling request, or periodic CSI and HARQ-ACK) transmission in subframe n will be described. If it is determined that the channel for the PUCCH cell is in an idle state after the channel sensing operation for the PUCCH cell and the PUSCH cell, the terminal may transmit the UCI information excluding the non-periodic CSI through the PUCCH that is configured in the PUCCH cell, and may transmit the non-periodic CSI information that is included in the PUSCH transmission in the licensed band that is configured for the non-periodic CSI information transmission. If it is determined that the channel for the PUCCH cell is not in an idle state after the channel sensing operation for the PUCCH cell and the PUSCH cell, the terminal may transmit the UCI information excluding the scheduling request that is included in the PUSCH transmission in the licensed band that is configured for the non-periodic CSI information transmission. Further, regardless of determination of whether the unlicensed band cell is an idle channel, the terminal may transmit the UCI information that is included in the PUSCH that is configured in the PUSCH transmission cell for the licensed band that is configured for a non-periodic CSI information report and in the cell having the smallest SCellIndex among the licensed band cells in which the PUSCH transmission has been configured.

Next, a case where PUSCH transmission for the non-periodic CSI transmission in subframe n for the cells that are included in the group (the second PUCCH group) for configured unlicensed band PUCCH transmission cell has been configured with respect to the unlicensed band cell, and PUSCH transmission for at least one licensed band has been configured in the terminal that performs UCI (e.g., non-periodic CSI, HARQ-ACK, scheduling request, or periodic CSI and HARQ-ACK) transmission in subframe n will be described. If it is determined that only the channel for the PUCCH cell is in an idle state after the channel sensing operation for the PUCCH cell and the PUSCH cell, and the PUSCH transmission cell that is configured for the non-periodic CSI transmission is equal to the PUCCH transmission cell, the terminal may transmit the UCI information excluding the non-periodic CSI through the PUCCH that is configured in the PUCCH cell, and may transmit the non-periodic CSI information through the PUSCH transmission cell that is configured for the non-periodic CSI information transmission. In this case, if it is determined that the PUSCH transmission cell that is configured for the non-periodic CSI transmission is different from the PUCCH transmission cell and the PUSCH cell is not in an idle state, the terminal may transmit the UCI information excluding the non-periodic CSI information through the PUCCH that is configured in the PUCCH cell, may not transmit the non-periodic CSI information, or may transmit the UCI that is included in the cell having the smallest SCellIndex among the licensed band cells in which the PUSCH has been configured.

Embodiment 3

Hereinafter, in the present disclosure, it is assumed that in a terminal in which one or more PUCCH transmission cells have been configured and PUCCH-PUSCH simultaneous transmission has not been configured, at least one of the configured PUCCH transmission cells is configured as a cell that operates in an unlicensed band, and UCI (e.g., information on at least one of periodic CSI, HARQ-ACK, scheduling request, periodic CSI and HARQ-ACK, HARQ-ACK and scheduling request, non-periodic CSI and HARQ-ACK, non-periodic CSI and scheduling request, or non-periodic CSI and HARQ-ACK and scheduling request) transmission for a PUCCH group (or the second PUCCH group) that is composed of cells that perform PUCCH transmission to the PUCCH transmission cell (hereinafter referred to as "PUCCH transmission cell") that operates in the configured unlicensed band is required in subframe n. A UCI transmission method that is proposed in the present disclosure will be described as follows. In this case, the method that is proposed in this embodiment can be applied to all embodiments that are described in the present disclosure without being limited to this embodiment. In this case, if the periodic CSI and non-periodic CSI information reports occur simultaneously, the terminal may give preference to the non-periodic CSI information report without reporting the periodic CSI information, or may give preference to the periodic CSI without reporting the non-periodic CSI information.

A case where PUSCH transmission for the cell that operates in at least one unlicensed band among the cells that are included in the group (the second PUCCH group) for the configured unlicensed band PUCCH transmission cell has been configured will be described. If it is determined that an unlicensed band channel of at least one of the above-described cells is in an idle state after the channel sensing operation for the PUCCH cell and PUSCH cell, a UCI transmission method of the terminal is determined in accordance with the cell in which it is determined that the unlicensed band channel is an idle channel, the kind of the UCI, and whether to transmit the PUSCH, and thus the present disclosure proposes a correct UCI transmission method of the terminal in the above-described case.

For example, if the PUSCH transmission has not been configured in the cell that operates in the licensed band among the cells that are included in the group for a unlicensed band PUCCH transmission cell at a UCI information transmission time, the terminal may or may not transmit the UCI information in accordance with the result of the channel sensing operation in the reference cell on the basis of one of the PUCCH cell and the unlicensed band cell in which the PUSCH transmission has been configured. As another example, if the PUSCH transmission has been configured in the cell that operates in at least one licensed band among the cells that are included in the group for the unlicensed band PUCCH transmission cell at the UCI information transmission time, the terminal transmits the UCI information that is included in the cell having the smallest SCellIndex among the licensed band cells. Hereinafter, the above-described case will be described in more detail.

Next, a case where the PUSCH transmission in subframe n has not been configured for the cells that are included in the group (the second PUCCH group) for the configured unlicensed band PUCCH transmission cells in the terminal that performs UCI (e.g., periodic CSI, HARQ-ACK, scheduling request, periodic CSI and HARQ-ACK, or HARQ-ACK and scheduling request) transmission in subframe n will be described. If it is determined that the channel for the PUCCH cell is in an idle state after the channel sensing operation for the PUCCH cell, the terminal may transmit the UCI through the PUCCH that is configured in the PUCCH cell. If it is determined that the channel for the PUCCH cell among the above-described cells is not in an idle state after the channel sensing operation for the PUCCH cell, the terminal may not transmit the UCI information to the PUCCH cell, or may transfer the UCI information through the PUCCH of PCell.

Next, a case where PUSCH transmission in subframe n for the cell that operates in the licensed band among the cells that are included in the group (the second PUCCH group) for the configured unlicensed band PUCCH transmission cell has not been configured, but PUSCH transmission for the cell that operates in at least one unlicensed band has been configured in the terminal that performs UCI (e.g., periodic CSI, HARQ-ACK, scheduling request, or periodic CSI and HARQ-ACK) transmission in subframe n will be described. If it is determined that only the channel for the PUCCH cell among the above-described cells is in an idle state after the channel sensing operation for the PUCCH cell and the PUSCH cell, and the PUSCH transmission in the PUSCH channel has not been configured, the terminal may transmit the UCI information through the PUCCH that is configured in the PUCCH cell. If it is determined that all the channels for the above-described cells are not in an idle state after the channel sensing operation for the PUCCH cell and the PUSCH cell, the terminal may not transmit the UCI information, or may transmit the UCI information through the PUCCH of PCell.

Further, if only PUCCH cell and PUSCH cell transmission has been configured in the unlicensed band as described above, the terminal may or may not transmit the UCI in accordance with the result of the channel sensing operation in a reference cell on the basis of one of the PUCCH cell and the PUSCH cell. For example, in the case of configuration on the basis of the PUCCH transmission cell, the terminal may transmit the UCI through the PUCCH that is configured in the PUCCH transmission cell if the channel for the PUCCH transmission cell is in an idle state regardless of the result of the channel sensing operation of the PUSCH transmission cell. Further, if the PUSCH cell is configured as the reference, the terminal may transmit the periodic CSI, HARQ-ACK, or periodic CSI and HARQ-ACK information that is included in the configured PUSCH transmission. Further, the terminal may transmit the UCI through the PUCCH of PCell regardless of the result of the channel sensing operation in the PUCCH cell and the PUSCH cell of the unlicensed band.

Next, a case where PUSCH transmission in subframe n for the cell that operates in the licensed band among the cells that are included in the group (the second PUCCH group) for the configured unlicensed band PUCCH transmission cell has not been configured, but PUSCH transmission for the cell that operates in at least one unlicensed band has been configured in the terminal that performs UCI (e.g., periodic CSI, HARQ-ACK, scheduling request, or periodic CSI and HARQ-ACK) transmission in subframe n will be described. If it is determined that only the channel for the PUCCH cell among the above-described cells is in an idle state after the channel sensing operation for the PUCCH cell and the PUSCH cell, and the PUSCH transmission in the PUCCH channel has been configured, the terminal may transmit at least the periodic CSI, HARQ-ACK, or periodic CSI and HARQ-ACK information of the UCI that is included in the PUSCH that is configured in the PUCCH cell. If the transmission of the PUSCH that is configured in the PUCCH cell is signal transmission for an initial access of the terminal, the UCI is not transmitted. If it is determined that the channels for the cells are not in an idle state after the channel sensing operation for the PUCCH cell and the PUSCH cell, the terminal may not transmit the UCI information, or may transmit the UCI information through the PUCCH of PCell.

A case where PUSCH transmission in subframe n for the cell that operates in the licensed band among the cells that are included in the group (the second PUCCH group) for the configured unlicensed band PUCCH transmission cell has not been configured, but PUSCH transmission for the cell that operates in at least one unlicensed band has been configured in the terminal that performs UCI (e.g., periodic CSI, HARQ-ACK, scheduling request, or periodic CSI and HARQ-ACK) transmission in subframe n will be described. If it is determined that the channel for the PUCCH cell among the above-described cells is not in an idle state after the channel sensing operation for the PUCCH cell and the PUSCH cell, but the channel for at least one PUSCH transmission cell is in an idle state, the terminal may transmit at least the periodic CSI, HARQ-ACK, or periodic CSI and HARQ-ACK information of the UCI information that is included in the PUSCH that is configured in the cell having the smallest SCellIndex among the cells in which it is determined that the channel is in the idle state, the cell in which it is most quickly determined that the channel is in the idle state, or the cell having the smallest SCellIndex among the PUSCH cells in which it is determined that the channel is in the idle state.

A case where PUSCH transmission in subframe n for the cell that operates in the licensed band among the cells that are included in the group (the second PUCCH group) for the configured unlicensed band PUCCH transmission cell has not been configured, but PUSCH transmission for the cell that operates in at least one unlicensed band has been configured in the terminal that performs UCI (e.g., periodic CSI, HARQ-ACK, scheduling request, or periodic CSI and HARQ-ACK) transmission in subframe n will be described. If it is determined that the channel for at least one PUSCH transmission cell including the PUCCH cell among the above-described cells is in an idle state after the channel sensing operation for the PUCCH cell and the PUSCH cell, and the PUSCH transmission in the PUCCH transmission cell has not been configured, the terminal may transmit at least the periodic CSI, HARQ-ACK, or periodic CSI and HARQ-ACK information of the UCI information that is included in the PUSCH that is configured in the cell having the smallest SCellIndex among the PUSCH cells in which it is determined that the channel is in the idle state, the cell in which it is most quickly determined that the channel is in the idle state, or the cell having the smallest SCellIndex among the cells in which it is determined that the channel is in the idle state.

A case where PUSCH transmission in subframe n for the cell that operates in the licensed band among the cells that are included in the group (the second PUCCH group) for the configured unlicensed band PUCCH transmission cell has not been configured, but PUSCH transmission for the cell that operates in at least one unlicensed band has been configured in the terminal that performs UCI (e.g., periodic CSI, HARQ-ACK, scheduling request, or periodic CSI and HARQ-ACK) transmission in subframe n will be described. If it is determined that the channel for at least one PUSCH transmission cell including the PUCCH cell among the above-described cells is in an idle state after the channel sensing operation for the PUCCH cell and the PUSCH cell, and the PUSCH transmission in the PUCCH transmission cell has been configured, the terminal may transmit at least the periodic CSI, HARQ-ACK, or periodic CSI and HARQ-ACK information of the UCI information that is included in the PUSCH that is configured in the PUCCH cell, or may transmit at least the periodic CSI, HARQ-ACK, or periodic CSI and HARQ-ACK information of the UCI information that is included in the PUSCH that is configured in the cell having the smallest SCellIndex among the PUSCH cells in which it is determined that the channel is in the idle state, the cell in which it is most quickly determined that the channel is in the idle state, or the cell having the smallest SCellIndex among the cells in which it is most quickly determined that the channel is in the idle state.

Next, a case where PUSCH transmission for non-periodic CSI transmission in subframe n for the cells that are included in the group (the second PUCCH group) for the configured unlicensed band PUCCH transmission cell has been configured with respect to the unlicensed band cell in the terminal that performs UCI (e.g., non-periodic CSI, HARQ-ACK, scheduling request, or HARQ-ACK and scheduling request) transmission in subframe n will be described. If it is determined that only the channel for the PUCCH cell is in an idle state after the channel sensing operation for the PUCCH cell and the PUSCH cell, the terminal may transmit the UCI information that excludes the non-periodic CSI information through the PUCCH that is configured in the PUCCH cell. If it is determined that the channel for the PUCCH cell is not in an idle state, but the PUSCH transmission cell for the non-periodic CSI transmission is in an idle state after the channel sensing operation for the PUCCH cell and the PUSCH cell, the terminal may transmit at least the non-periodic CSI or non-periodic CSI and HARQ-ACK information through the PUSCH that is configured in the PUSCH transmission cell. If it is determined that the PUCCH cell and the PUSCH transmission cell for the non-periodic CSI transmission are in an idle state after the channel sensing operation for the PUCCH cell and the PUSCH cell, the terminal may transmit the non-periodic CSI or non-periodic CSI and HARQ-ACK in the PUSCH transmission cell for the non-periodic CSI transmission. If it is determined that both the PUCCH cell and the PUSCH transmission cell for the non-periodic CSI transmission are not in an idle state after the channel sensing operation for the PUCCH cell and the PUSCH cell, the terminal may not transmit the UCI information, or may transmit the remaining UCI information that excludes the non-periodic CSI information through the PUCCH of PCell.

Next, a case where PUSCH transmission for the cell that operates in at least one licensed band among the cells that are included in the group (the second PUCCH group) for the configured unlicensed band PUCCH transmission cell has been configured in the terminal that performs UCI transmission in subframe n will be described. In this case, the UCI may be transmitted from one of licensed band cells in which the PUSCH transmission has been configured, for example, from a cell having the smallest SCellIndex among the licensed band cells in which the PUSCH transmission has been configured. More detailed operation thereof is as follows.

A case where PUSCH transmission for the cell that operates in at least one licensed band among the cells that are included in the group (the second PUCCH group) for the configured unlicensed band PUCCH transmission cell has been configured in the terminal that performs UCI (e.g., periodic CSI, HARQ-ACK, scheduling request, or periodic CSI and HARQ-ACK) transmission in subframe n will be described. If it is determined that only the channel for the PUCCH cell among the above-described cells is in an idle state after the channel sensing operation for the PUCCH cell and the PUSCH cell, and the PUSCH transmission in the PUCCH cell has not been configured, the terminal may transmit the UCI information through the PUCCH that is configured in the PUCCH cell, or may transmit at least periodic CSI or HARQ-ACK periodic CSI and HARQ-ACK information of the UCI information that is included in the PUSCH that is configured in the cell having the smallest SCellIndex among the licensed band cells in which the PUSCH transmission has been configured. In this case, if the PUSCH transmission for the cell that operates in at least one licensed band is configured, the terminal may transmit at least periodic CSI or HARQ-ACK periodic CSI and HARQ-ACK information of the UCI information that is included in the PUSCH that is configured in the cell having the smallest SCellIndex among the licensed band cells in which the PUSCH transmission has been configured regardless of determination of whether the unlicensed band cell is an idle channel.

A case where PUSCH transmission in subframe n for the cells that are included in the group (the second PUCCH group) for the configured unlicensed band PUCCH transmission cell has been configured in the terminal that performs UCI (e.g., periodic CSI, HARQ-ACK, scheduling request, or periodic CSI and HARQ-ACK) transmission in subframe n will be described. If it is determined that only the channel for the PUCCH cell among the above-described cells is in an idle state after the channel sensing operation for the PUCCH cell and the PUSCH cell, and the PUSCH transmission in the PUCCH cell has been configured, the terminal may transmit at least periodic CSI information or HARQ-ACK periodic CSI and HARQ-ACK information of the UCI information that is included in the PUSCH that is configured in the PUCCH cell. Further, regardless of determination of whether the unlicensed band cell is an idle channel, the terminal may transmit at least periodic CSI information, HARQ-ACK, or periodic CSI and HARQ-ACK information of the UCI information that is included in the PUSCH that is configured in the cell having the smallest SCellIndex among the licensed band cells in which the PUSCH transmission has been configured. If the PUSCH transmission that is configured in the PUCCH cell is signal transmission for an initial access of the terminal, the UCI is not transmitted.

Next, a case where PUSCH transmission for the non-periodic CSI transmission in subframe n for the cells that are included in the group (the second PUCCH group) for the configured unlicensed band PUCCH transmission cell has been configured in the terminal that performs UCI (e.g., non-periodic CSI, HARQ-ACK, scheduling request, or periodic CSI and HARQ-ACK) transmission in subframe n will be described. The terminal may transmit the non-periodic CSI or non-periodic CSI and HARQ-ACK information of the UCI information that is included in the PUSCH transmission in the licensed band regardless of the result of the channel sensing operation for the PUCCH cell. In this case, the UCI that excludes the non-periodic CSI and HARQ-ACK information may not be transmitted.

Next, a case where PUSCH transmission for the non-periodic CSI transmission in subframe n for the cells that are included in the group (the second PUCCH group) for the configured unlicensed band PUCCH transmission cell has been configured with respect to the unlicensed band cell, and PUSCH transmission in at least one licensed band has been configured in the terminal that performs UCI (e.g., non-periodic CSI, HARQ-ACK, scheduling request, or periodic CSI and HARQ-ACK) transmission in subframe n will be described. The terminal may transmit at least HARQ-ACK information of the UCI information that is included in the PUSCH transmission in the cell having the smallest SCellIndex among the PUSCH transmission cells in the licensed band regardless of the result of the channel sensing operation for the PUCCH cell. In this case, the UCI that excludes the HARQ-ACK information may not be transmitted.

Figure 6:
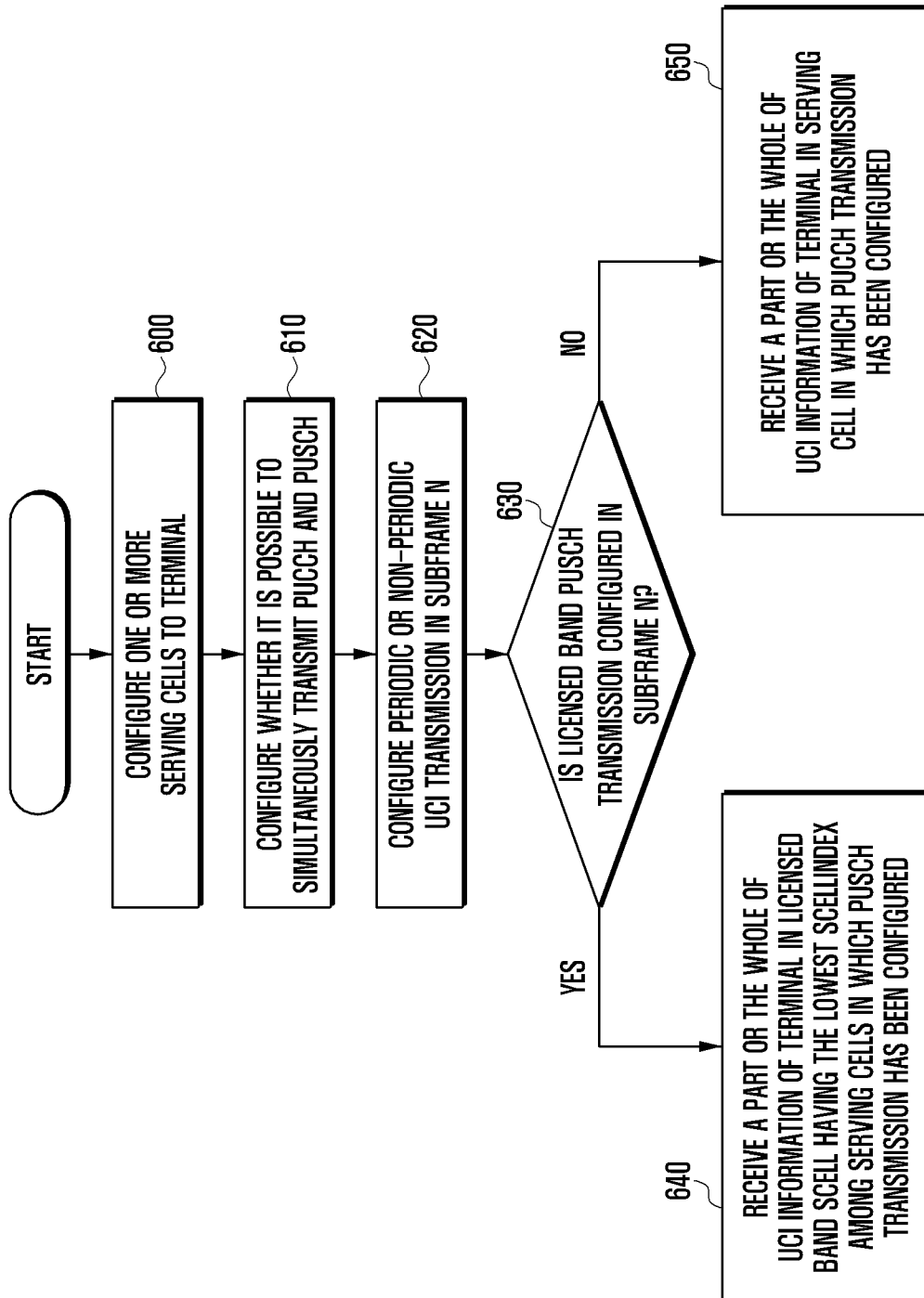
FIG. 6 is a flowchart illustrating a base station operation method for receiving UCI information.

FIG. 6 is a flowchart illustrating a base station operation method for receiving UCI information according to an embodiment of the present disclosure.

At operation 600, a base station may configure one or more serving cells in accordance with capabilities of the base station and a terminal. In this case, the configured serving cell may include a cell that operates in an unlicensed band in accordance with the capabilities of the base station and the terminal, and the number of serving cells that can be configured may differ also in accordance with the capabilities of the base station and the terminal. At operation 610, the base station may or may not configure PUCCH and PUSCH simultaneous transmission to the terminal in accordance with the determination of the base station and whether the PUCCH and PUSCH simultaneous transmission of the terminal can be performed. Referring to FIG. 6, it is assumed that the base station does not configure the PUCCH and PUSCH simultaneous transmission to the terminal. However, various embodiments of the present disclosure can be applied even in the case where the base station configures the PUCCH and PUSCH simultaneous transmission to the terminal. At operation 620, if the base station requests/configures non-periodic CSI information transmission with respect to the terminal in subframe n-K, or the terminal configures transmission of UCI information, such as periodic CSI, HARQ-ACK, or SR, in subframe n, at least one of UCI information configuration of the terminal and a cell in which the UCI is transmitted may be differently configured depending on whether to transmit PUSCH in at least one of PCell in subframe n and SCell that operates in a licensed band or an unlicensed band. Referring to FIG. 6, the base station operates to request the terminal to report non-periodic CSI information in subframe n-K, and to transmit the non-periodic CSI information through the PUSCH in the licensed band in subframe n. However, various embodiments of the present disclosure as described above can be applied even in the case where the base station configures only transmission of PCell or PUSCH in the unlicensed band to the terminal. At operation 630, the base station determines whether to configure the PUSCH transmission to the terminal in at least one licensed band in subframe n. Accordingly, the terminal transmits the UCI information to the base station through the SCell having the smallest SCellIndex among SCells in which the PUSCH transmission has been configured or the configured licensed band PUSCH, and the base station receives a part or the whole of the UCI information of the terminal through the SCell at operation 640. In this case, if there is not PUSCH transmission configuration in the licensed band in subframe n, the terminal transmits a part or the whole of the UCI information of the terminal in the cell in which the PUCCH transmission has been configured, and the base station receives the part or the whole of the UCI information of the terminal through the PUCCH at operation 650.

Figure 7:
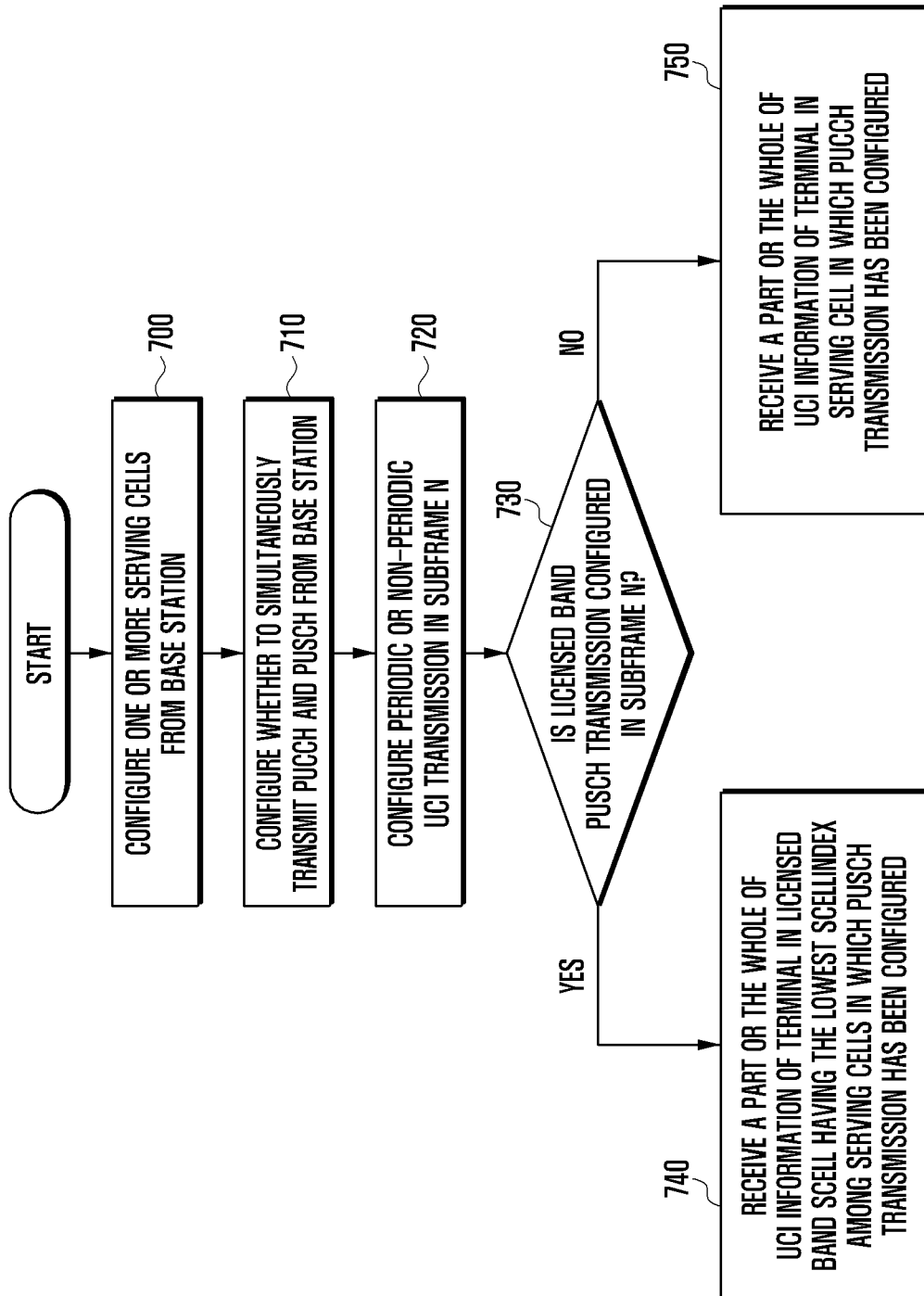
FIG. 7 is a flowchart illustrating a terminal operation method for transmitting UCI information.

FIG. 7 is a flowchart illustrating a terminal operation method for transmitting UCI information according to an embodiment of the present disclosure.

At operation 700, the terminal may receive a request for configuration of one or more serving cells from the base station in accordance with capabilities of the base station and the terminal. In this case, the configured serving cell may include a cell that operates in the unlicensed band in accordance with the capabilities of the base station and the terminal, and the number of serving cells that can be configured may differ also in accordance with the capabilities of the base station and the terminal. At operation 710, the terminal may receive configuration on whether PUCCH and PUSCH simultaneous transmission can be performed from the base station, and operates in accordance with the received configuration. Referring to FIG. 7, it is assumed that the base station does not configure the PUCCH and PUSCH simultaneous transmission to the terminal. However, various embodiments of the present disclosure can be applied even in the case where the base station configures the PUCCH and PUSCH simultaneous transmission to the terminal. At operation 720, if the base station requests/configures non-periodic CSI information transmission with respect to the terminal in subframe n-K, or the terminal configures transmission of the UCI information, such as periodic CSI, HARQ-ACK, or SR, in subframe n, at least one of UCI information configuration of the terminal and a cell in which the UCI is transmitted may be differently configured depending on whether to transmit the PUSCH in at least one of PCell in subframe n and SCell that operates in a licensed band or an unlicensed band. Referring to FIG. 7, the base station operates to request the terminal to report non-periodic CSI information in subframe n-K, and to transmit the non-periodic CSI information through the PUSCH in the licensed band in subframe n. However, various embodiments of the present disclosure as described above can be applied even in the case where the base station configures only transmission of PCell or PUSCH in the unlicensed band to the terminal. At operation 730, the terminal determines whether to configure the PUSCH transmission from the base station to the terminal in at least one licensed band in subframe n. Accordingly, the terminal transmits the UCI information to the base station through the SCell having the smallest SCellIndex among SCells in which the configured licensed band PUSCH or SCell has been configured at operation 740. In this case, if there is not PUSCH transmission configuration in the licensed band in subframe n, the terminal transmits a part or the whole of the UCI information of the terminal in the cell in which the PUCCH transmission has been configured through the PUCCH at operation 750.

If the terminal transmits the corresponding UCI that is included in the SCell having the smallest SCellIndex among the SCells in which the PUSCH transmission has been configured after performing channel sensing operation for the SCell in which uplink transmission is possible, the SCell having the smallest SCellIndex in which the UCI is included may be changed in accordance with the result of the channel sensing operation. In this case, between channel sensing operation end time for the Scell and PUSCH transmission start time for the Scell, only transition time for changing a reception operation to a transmission operation exists, which is 0 or very short time, and thus it may be difficult to regenerate the signal to be transmitted on the PUSCH so that that terminal makes the UCI included in uplink data, Accordingly, in the case of transmitting only the PUSCH with respect to the respective SCells in which uplink transmission has been configured, the terminal may generate in advance the uplink transmission signal for transmitting the UCI that is included in the PUSCH, Thereafter, the terminal may perform the channel sensing operation for the SCells, perform transmission of the UCI that is included in the PUSCH in the Scell having the smallest SCellIndex among SCells that are determined as idle channels, and perform PUSCH transmission that includes only the uplink data information without control information in the remaining SCells.

In this case, the base station does not know what Scell the UCI of the terminal is transmitted through, In other words, since the base station does not know the result of the channel sensing operation of the terminal, it should find out whether the UCI is included with respect to all SCells in which the uplink transmission has been configured through the terminal, In other words, the base station should decode the uplink signal on the assumption that the UCI is included in the Scell PUSCH transmission and should decode the uplink signal on the assumption that the UCI is not included in the SCell PUSCH transmission with respect to all the SCells in which the uplink transmission has been configured through the base station, In this case, in order to operate the base station more efficiently, the base station may first detect whether the uplink signal of the corresponding terminal has been transmitted in the order of SCell having the smallest SCellIndex among all SCells in which the uplink transmission has been configured through the terminal, For example, whether the uplink signal of the terminal has been transmitted can be determined using the existence/nonexistence of DMRS for the uplink data channel of the terminal or the level of a received power that is measured from frequency/time resources in which the uplink transmission has been configured.

Specifically, the base station determines whether the uplink transmission of the terminal has been performed in the Scell having the smallest SCellIndex among all the SCells in which the uplink transmission has been configured through the terminal, If it is determined that the terminal has not performed the uplink transmission in the Scell having the smallest SCellIndex, the base station determines whether the uplink transmission of the terminal has been performed with respect to the SCell having the next small SCellIndex, If the uplink transmission of the terminal is detected in the Scell having the smallest SCellIndex, the base station may perform decoding on the assumption that the UCI is included in the PUSCH transmission in the Scell.

If it is determined that the UCI is included in the SCell having the smallest SCellIndex, the base station may perform decoding of the corresponding PUSCH on the assumption that the UCI information is not included in other SCells, In other words, if it is determined that the UCI information is included in one of the above-described SCells, the base station assumes that the SCellIndex is not transmitted from other cells, and decodes only the PUSCH information without considering a case where the UCI information that is included in the PUSCH is transmitted for data decoding of the corresponding SCells.

Figure 8:
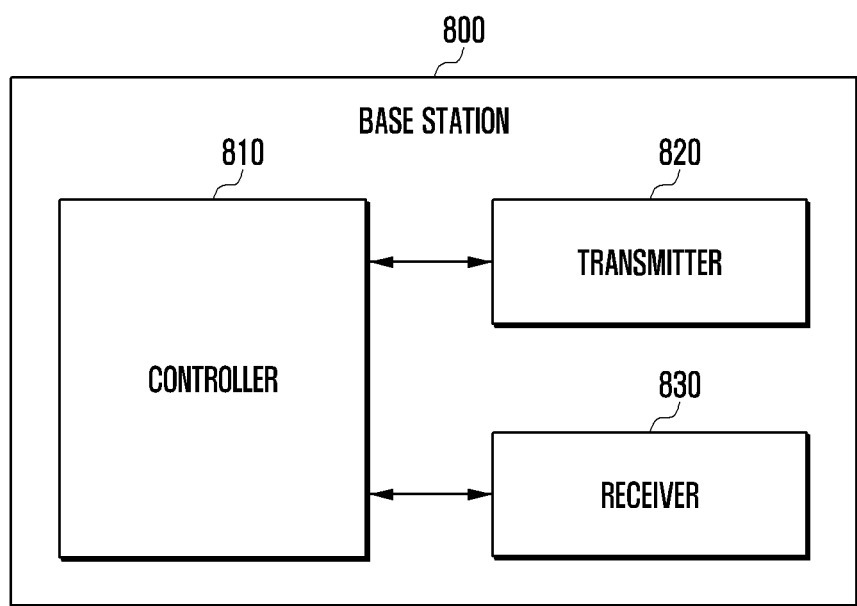
FIG. 8 is a diagram illustrating a base station device according to embodiments of the present disclosure.

FIG. 8 is a diagram illustrating a base station device according to embodiments of the present disclosure.

A receiver 830 of a base station 800 may receive signals from another base station or a terminal and may measure channels from the base station or the terminal, Further, the receiver may sense unlicensed band channels using setting values for the channel sensing operation that is configured through a base station controller 810, Further, when occupying the unlicensed band, the receiver may determine the transmission power that can be transmitted in the unlicensed band, The base station controller 810 may determine whether the unlicensed band is in an idle state using information on the unlicensed band that is sensed by the receiver 830, If the unlicensed band is determined to be in an idle state, the base station controller 810 may transmit a signal for channel occupation in a transmitter 820 of the base station, control channel and data channel information for a specific terminal, or configuration information on the transmission power of an LAA cell, Further, the base station controller 810 may control the receiver 830 to correctly receive the UCI transmission of the terminal through which at least one of the UCI information, UCI transmission cell, and UCI transmission channel may be changed in accordance with the PUSCH transmission configuration in the licensed band or unlicensed band at UCI information transmission time of the terminal.

If the determined unlicensed band is not in an idle state, the base station controller 810 may be configured to continuously perform the channel sensing operation through the base station receiver 830, The base station controller 810 may determine a part or the whole of parameters which include control channel transmission parameter configuration, such as PDCCH/EPDCCH for a specific terminal, various kinds of reference signal transmission parameter configuration, PDSCH/DPDSCH scheduling information, CRS, CSI-RS, DRS, and PDSCH that are required for configuration or transfer between the base station and the terminal, Further, the base station controller 810 may configure cells that operate in one or more of different bands, that is, the licensed band and the unlicensed band, in accordance with the capabilities of the base station and the terminal to the terminal, and may configure PUCCH and PUSCH simultaneous transmission.

Figure 9:
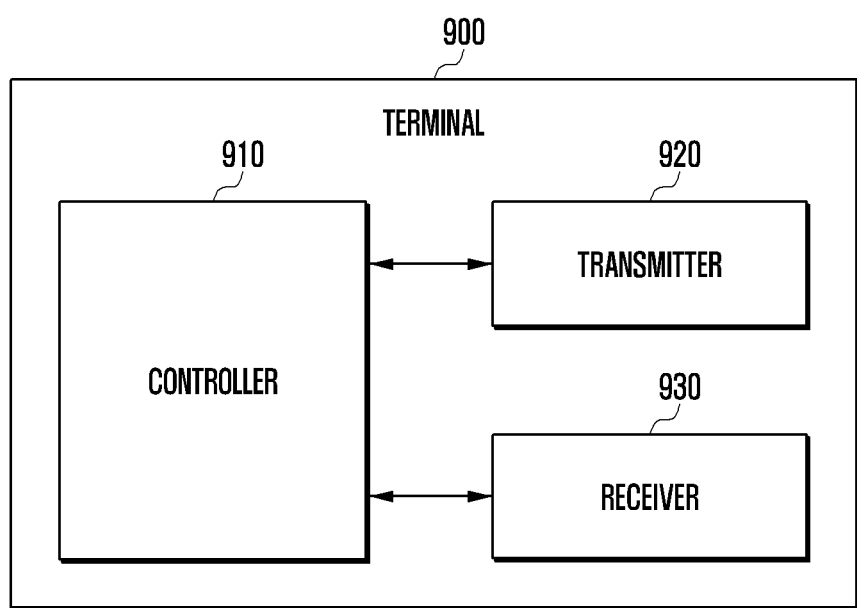
FIG. 9 is a diagram illustrating a terminal device according to embodiments of the present disclosure.

FIG. 9 is a diagram illustrating a terminal device according to embodiments of the present disclosure.

Referring to FIG. 9, a controller 910 of a terminal 900 controls a receiver 930 to receive configuration information between the base station and the terminal for signal transmission in a licensed band and an unlicensed band from the base station, and uses the unlicensed band in accordance with the received configuration values, Further, the controller may receive a first signal transmittable time, a second signal transmittable time, and the signal configuration from the base station through the receiver 930 of the terminal, or may receive configuration of the channel occupation period of the LAA cell or determination methods for the last partial subframe, Further, the terminal 900 may receive configuration information on the transmission power in the channel occupation period of the LAA cell from the base station through the receiver 930, The controller 910 may acquire status information of the corresponding unlicensed band suing at least one of a configuration value for determining whether scheduling can be performed in a subframe that performs the channel sensing operation that is configured by the base station and is received through the receiver 930, a configuration value for a signal that is transmitted to a channel occupation start symbol of the base station, unlicensed band status information that can be transmitted by the base station to the terminal using the licensed band or another unlicensed band, and transmission power configuration information in the channel occupation period of the LAA cell, and may receive a signal from the unlicensed band, Further, the controller 910 may determine whether to occupy the channel of the LAA cell using the second signal transmission that is received and detected from the LAA cell, Further, the controller 910 may determine the length of the last partial subframe of the LAA cell using at least one of the first or second signal transmittable time that is configured from the LAA cell and the channel occupation period of the LAA cell, Further, the controller 910 may determine the result of receiving a data signal that is received from the base station, and may report the result of data reception to the base station through the transmitter 920, Further, the controller 910 may control the receiver 930 to receive a correct signal using the transmission power for the channel occupation period of the LAA cell that is received from the LAA cell, Further, the controller 910 or the receiver 930 may include a decoder that receives PDCCH/EPDCCH and PDSCH and decodes the PDSCH, Further, in accordance with the PUSCH transmission configuration in the licensed band or the unlicensed band at the UCI information transmission time of the terminal, the transmitter may correctly transmit the UCI transmission of the terminal through changing of at least one of the UCI information, UCI transmission cell, and a UCI transmission channel under the control of the controller 910.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method performed by a base station in a communication system, the method comprising:

receiving, from a terminal, first control information on a physical uplink shared channel (PUSCH) of a secondary cell (SCell) other than an unlicensed band SCell and second control information on a physical uplink control channel (PUCCH), in case that the terminal is configured with more than one serving cell and a simultaneous transmission of the PUSCH and the PUCCH, and the PUSCH is not transmitted on a primary cell (PCell) and the PUSCH is transmitted on the SCell, wherein the first control information is periodic channel state information (CSI) and the second control information is a hybrid automatic repeat request (HARQ) acknowledgement (ACK), and wherein the first control information and the second control information are received on the PUCCH in case that the PUSCH is transmitted on the unlicensed band SCell excluding the PCell and the SCell associated with a licensed band SCell.

2. The method of claim 1, wherein the second control information is received on the PUCCH without the first control information, in case that:

the PUSCH is transmitted on the unlicensed band SCell excluding the PCell and the SCell associated with the licensed band SCell, and simultaneous transmission of the first control information and the second control information is not configured.

3. The method of claim 1, wherein the first control information and the second control information are received on a same subframe without the PUSCH.

4. The method of claim 1, wherein the first control information is received on the PUSCH of the SCell other than an unlicensed band with a smallest SCell index.

5. A method performed by a terminal in a communication system, the method comprising:

transmitting, to a base station, first control information on a physical uplink shared channel (PUSCH) of an secondary cell (SCell) other than an unlicensed band SCell and second control information on a physical uplink control channel (PUCCH), in case that the terminal is configured with more than one serving cell and a simultaneous transmission of the PUSCH and the PUCCH, and the PUSCH is not transmitted on a primary cell (PCell) and the PUSCH is transmitted on the SCell, wherein the first control information is periodic channel state information (CSI) and the second control information is a hybrid automatic repeat request (HARQ) acknowledgement (ACK), and wherein the first control information and the second control information are transmitted on the PUCCH in case that the PUSCH is transmitted on the unlicensed band SCell excluding the PCell and the SCell associated with a licensed band SCell.

6. The method of claim 5, wherein the second control information is transmitted on the PUCCH without the first control information, in case that:

the PUSCH is transmitted on the unlicensed band SCell excluding the PCell and the SCell associated with the licensed band SCell, and simultaneous transmission of the first control information and the second control information is not configured.

7. The method of claim 5, wherein the first control information and the second control information are transmitted on a same subframe without the PUSCH.

8. The method of claim 5, wherein the first control information is transmitted on the PUSCH of the SCell other than an unlicensed band with a smallest SCell index.

9. A base station in a communication system, the base station comprising:

a transceiver; and a controller configured to receive, from a terminal via the transceiver, first control information on a physical uplink shared channel (PUSCH) of an secondary cell (SCell) other than an unlicensed band SCell and second control information on a physical uplink control channel (PUCCH), in case that the terminal is configured with more than one serving cell and a simultaneous transmission of the PUSCH and the PUCCH, and the PUSCH is not transmitted on a primary cell (PCell) and the PUSCH is transmitted on the SCell, wherein the first control information is periodic channel state information (CSI) and the second control information is a hybrid automatic repeat request (HARQ) acknowledgement (ACK), and wherein the first control information and the second control information are received on the PUCCH in case that the PUSCH is transmitted on the unlicensed band SCell excluding the PCell and the SCell associated with a licensed band SCell.

10. The base station of claim 9, wherein the second control information is received on the PUCCH without the first control information, in case that:

the PUSCH is transmitted on the unlicensed band SCell excluding the PCell and the SCell associated with licensed band SCell, and simultaneous transmission of the first control information and the second control information is not configured.

11. The base station of claim 9, wherein the first control information and the second control information are received on a same subframe without the PUSCH.

12. The base station of claim 9, wherein the first control information is received on the PUSCH of the SCell other than an unlicensed band with a smallest SCell index.

13. A terminal in a communication system, the terminal comprising:

a transceiver; and a controller configured to transmit, to a base station via the transceiver, first control information on a physical uplink shared channel (PUSCH) of an secondary cell (SCell) other than an unlicensed band SCell and second control information on a physical uplink control channel (PUCCH), in case that the terminal is configured with more than one serving cell and a simultaneous transmission of the PUSCH and the PUCCH, and the PUSCH is not transmitted on a primary cell (PCell) and the PUSCH is transmitted on the SCell, wherein the first control information is periodic channel state information (CSI) and the second control information is a hybrid automatic repeat request (HARQ) acknowledgement (ACK), and wherein the first control information and the second control information are transmitted on the PUCCH in case that the PUSCH is transmitted on the unlicensed band SCell excluding the PCell and the SCell associated with a licensed band SCell.

14. The terminal of claim 13, wherein the second control information is transmitted on the PUCCH without the first control information, in case that:

the PUSCH is transmitted on the unlicensed band SCell excluding the PCell and the SCell associated with the licensed band SCell, and simultaneous transmission of the first control information and the second control information is not configured.

15. The terminal of claim 13, wherein the first control information and the second control information are transmitted on a same subframe without the PUSCH.

16. The terminal of claim 13, wherein the first control information is transmitted on the PUSCH of the SCell other than an unlicensed band with a smallest SCell index.

* * * * *